United States Patent
Kishigami et al.

(10) Patent No.: US 9,213,091 B2
(45) Date of Patent: Dec. 15, 2015

(54) RADAR DEVICE

(75) Inventors: Takaaki Kishigami, Tokyo (JP); Yoichi Nakagawa, Tokyo (JP); Hirohito Mukai, Tokyo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 140 days.

(21) Appl. No.: 13/814,712

(22) PCT Filed: Aug. 16, 2011

(86) PCT No.: PCT/JP2011/004591
§ 371 (c)(1),
(2), (4) Date: Feb. 6, 2013

(87) PCT Pub. No.: WO2012/029242
PCT Pub. Date: Mar. 8, 2012

(65) Prior Publication Data
US 2013/0135140 A1    May 30, 2013

(30) Foreign Application Priority Data

Sep. 2, 2010  (JP) .................................. 2010-197023

(51) Int. Cl.
*G01S 13/10* (2006.01)
*G01S 7/282* (2006.01)
(Continued)

(52) U.S. Cl.
CPC ............... *G01S 13/284* (2013.01); *G01S 7/282* (2013.01); *G01S 13/288* (2013.01); *G01S 13/582* (2013.01); *G01S 13/931* (2013.01); *G01S 2007/2886* (2013.01)

(58) Field of Classification Search
CPC ............. G01S 7/02; G01S 7/28; G01S 7/282; G01S 7/285; G01S 13/02; G01S 13/06; G01S 13/08; G01S 13/10; G01S 13/26; G01S 13/28; G01S 13/284; G01S 13/288; G01S 13/50; G01S 13/58; G01S 13/581; G01S 13/582; G01S 13/88; G01S 13/93; G01S 13/931; G01S 7/288; G01S 2007/2886; G01S 13/286; H04B 1/69; H04B 1/707; H04L 27/32; H04L 27/34; H04L 27/36; H04L 27/362; H04L 27/364

USPC .............. 342/22, 27, 28, 70–72, 82, 89, 118, 342/128–145, 175, 189, 192–197, 200–204, 342/91; 332/103, 104, 105; 375/259, 271, 375/279–284, 295, 302, 308, 130, 132, 135, 375/140, 146, 298; 380/277, 44, 46
See application file for complete search history.

(56) References Cited

U.S. PATENT DOCUMENTS 3,680,105 A * 7/1972 Goldstone ...................... 342/194
4,153,900 A * 5/1979 Novak et al. .................. 342/201
(Continued)

FOREIGN PATENT DOCUMENTS

JP    01-303135 A    12/1989
JP    11-341092 A    12/1999
(Continued)

OTHER PUBLICATIONS

M.I. Skolnik, "Introduction to Radar Systems"; second edition; McGraw-Hill Book Company; New York, NY, USA; 1980; p. 8, Table 1.1.*

(Continued)

*Primary Examiner* — Bernarr Gregory
(74) *Attorney, Agent, or Firm* — Seed IP Law Group PLLC

(57) ABSTRACT

A radio frequency transmission signal is transmitted from a transmission antenna with a predetermined transmission period, and a signal of a reflected wave reflected from a target is received by a reception antenna. A code generator generates a first code sequence and second code sequence that constitute a pair of complementary codes. A first modulator modulates the first code sequence to generate a first transmission signal. A second modulator modulates the second code sequence to generate a second transmission signal. A quadrature modulator performs quadrature modulation by using the generated first and second transmission signals. The radio frequency transmission signal is generated from a signal that is quadrature modulated, and transmitted from the transmission antenna.

12 Claims, 16 Drawing Sheets

(51) Int. Cl.
  *G01S 13/28* (2006.01)
  *G01S 13/58* (2006.01)
  *G01S 13/00* (2006.01)
  *G01S 7/00* (2006.01)
  *G01S 13/93* (2006.01)
  *G01S 7/288* (2006.01)

(56) References Cited

U.S. PATENT DOCUMENTS

| | | | |
|---|---|---|---|
| 4,521,779 A * | 6/1985 | Lewis | 342/194 |
| 4,937,580 A * | 6/1990 | Wills | 342/22 |
| 5,325,095 A * | 6/1994 | Vadnais | G01S 13/286 342/129 |
| 5,376,939 A * | 12/1994 | Urkowitz | 342/134 |
| 5,440,311 A * | 8/1995 | Gallagher et al. | 342/132 |
| 5,848,160 A * | 12/1998 | Cai | H04B 1/707 380/46 |
| 5,861,834 A | 1/1999 | Sauer et al. | |
| 6,693,582 B2 * | 2/2004 | Steinlechner et al. | 342/70 |
| 7,953,328 B2 * | 5/2011 | Tao | H04L 27/364 375/298 |
| 2008/0112501 A1 | 5/2008 | Diaz Fuente et al. | |
| 2009/0092392 A1 | 4/2009 | Huang et al. | |
| 2010/0111217 A1 | 5/2010 | Fuente | |

FOREIGN PATENT DOCUMENTS

| | | |
|---|---|---|
| JP | 2003-290454 A | 10/2003 |
| JP | 2004112774 A | 4/2004 |
| JP | 2005-321359 A | 11/2005 |
| JP | 2008-260886 A | 10/2008 |
| JP | 2009095025 A | 4/2009 |
| WO | 2009/092393 A1 | 7/2009 |
| WO | WO2009/092393 A1 * | 7/2009 ............ G01S 13/28 |

OTHER PUBLICATIONS

International Search Report, mailed Nov. 8, 2011, for International Application No. PCT/JP2011/004591, 4 pages.
Budisin, S.Z., "Efficient Pulse Compressor for Golay Complementary Sequences," Electronics Letters 27(3):219-220, Jan. 31, 1991.
Bussgang, J.J. et al., "A Unified Analysis of Range Performance of CW, Pulse, and Pulse Doppler Radar," Proceedings of the IRE 47(10):1753-1762, 1959.
Extended European Search Report dated Jun. 11, 2014, for corresponding EP Application No. 11821267.9-1812 / 2613174, 7 pages.
Guey et al., "Diversity Waveform Sets for Delay-Doppler Imaging," IEEE Transactions on Information Theory, IEEE Press, USA, 44(4), Jul. 1, 1998, pp. 1504-1522. (20 pages).

* cited by examiner (a)

METHOD OF PRODUCING COMPLEMENTARY CODES a, a HAVING CODE LENGTH L = 2P a=[1 1]; b=[1 −1];

for ii=1:P−1 c=a;

d=b;

a=[c d];%   COUPLING OF SUB CODES c, d b=[c −d];%  COUPLING OF SUB CODES c, -d
                 AND -d MEANS MULTIPLICATION OF -1 WITH SUB CODE d end (a)

(b)

(c)

RADAR DEVICE

BACKGROUND

1. Technical Field

The present invention relates to a radar device which receives a signal of a reflected wave that is reflected from a target, through an antenna to detect the target.

2. Description of the Related Art

A radar device radiates a radio wave from a measuring point, which receives a signal of a reflected wave that is reflected from a target, and which measures the distance between the measuring point and the target, the direction, and the like. Recently, particularly, a radar device which can detect not only an automobile, but also a pedestrian as a target by a high-resolution measurement using a short-wavelength radio wave such as a microwave or a millimeter wave has been developed.

A radar device sometimes receives a signal in which a reflected wave from a target at a short distance and that from a target at a long distance are mixed with each other. In the case where a range side lobe appears in the autocorrelation characteristics of a signal of a reflected wave from a target at a short distance, particularly, the range side lobe is sometimes mixed with a main lobe appearing in the autocorrelation characteristics of a signal of a reflected wave from a target at a long distance. In this case, the accuracy of detection in which the radar device detects the target at a long distance may be impaired.

In the case where an automobile and a pedestrian are at the same distance from a measuring point, moreover, a radar device sometimes receives a signal in which signals of reflected wave from the automobile and pedestrian having different radar cross sections (RCS) are mixed with each other. It is usually said that the radar cross section of a pedestrian is smaller than that of an automobile. Therefore, a radar device is requested to, even in the case where an automobile and a pedestrian are at the same distance from a measuring point, properly receive not only a reflected wave from the automobile, but also that from the pedestrian.

Therefore, a radar device which must perform a high-resolution measurement on a plurality of targets such as those described above is requested to transmit a pulse wave or pulse modulated wave having characteristics in which the autocorrelation characteristics are in the low range side lobe level (hereinafter, referred to as "low range side lobe characteristics"). Moreover, such a radar device is requested to have a reception dynamic range which is so wide that, in the reception by the radar device, signals of reflected waves reflected from targets that cause various reception levels depending on the distance and kind of a target can be received.

In regard to the above-described low range side lobe characteristics, a pulse compression radar has been known which, by using a complementary code, transmits a radio frequency transmission signal as a pulse wave or pulse modulated wave having the low range side lobe characteristics. Here, the pulse compression means that a pulse signal is pulse-modulated or phase-modulated, transmission is performed by using a signal having a wide pulse width, and, in signal processing after reception, the received signal is demodulated and converted (compressed) to a signal having a narrow pulse width, and is a method of equivalently enhancing the reception power. According to the pulse compression, the target detectable distance can be increased, and the distance estimation accuracy with respect to the detectable distance can be improved.

A complementary code is configured by a plurality of, for example, two complementary code sequences ($a_n$, $b_n$), and has characteristics that, considering results of autocorrelation calculations of one complementary code sequence $a_n$ and the other complementary code sequence $b_n$, in the case where the results of autocorrelation calculations are added together while the delay times (shift times) $\tau$ [sec.] are made consistent with each other, the range side lobe is zero. The parameter n is n=1, 2, ..., L. The parameter L indicates the code sequence length, or simply the code length.

A method of producing a complementary code will be described with reference to FIG. 14. FIG. 14 is a view showing an example of a procedure of producing a code sequence of usual complementary codes. As shown in FIG. 14, from the descriptions of the fourth and fifth rows, a subcode sequence (c, d) consisting of an element of 1 or an element of −1 and having a code length of $L=2^{p-1}$ is generated, and, from the descriptions of the sixth and seventh rows, a complementary code sequence (a, b) having a code length of $L=2^p$ is generated. Here, one complementary code sequence a is a coupling of the subcode sequence c and the subcode sequence d, and the other complementary code sequence b is a coupling of the subcode sequence c and the subcode sequence −d.

The code sequences a, b indicate complementary code sequences, respectively, and the code sequences c, d indicate subcode sequences constituting a complementary code sequence, respectively. The parameter p defines the code length L of the generated complementary code sequences (a, b).

The characteristics of such a complementary code (complementary code sequence) will be described with reference to FIG. 15. FIG. 15 shows views illustrating the characteristics of a conventional complementary code. In the figure, (a) is a view showing results of the autocorrelation calculation of the one complementary code sequence $a_n$, (b) is a view showing results of the autocorrelation calculation of the other complementary code sequence bn, and (c) is a view showing an additional value of the results of the autocorrelation calculations of the two complementary code sequences ($a_n$, $b_n$). The code length L of the complementary codes used in FIG. 15 is 128.

The result of the autocorrelation calculation of the one complementary code sequence $a_n$ of the two complementary code sequences ($a_n$, $b_n$) is derived in accordance with Exp. (1). The result of the autocorrelation calculation of the other complementary code sequence $b_n$ is derived in accordance with Exp. (2). The parameter R represents the result of the autocorrelation calculation. In the case where n>L or n<1, the complementary code sequences $a_n$, $b_n$ are set to zero (i.e., when n>L or n<1, $a_n$=0, $b_n$=0). The asterisk * represents a complex conjugate operator.

[Exp. 1]
$$R_{aa}(\tau) = \sum_{n=1}^{L} a_n a_{n+\tau}^* \tag{1}$$

[Exp. 2]
$$R_{bb}(\tau) = \sum_{n=1}^{L} b_n b_{n+\tau}^* \tag{2}$$

As shown in FIG. 15(a), in the result $R_{aa}(t)$ of the autocorrelation calculation of the one complementary code sequence $a_n$ derived in accordance with Exp. (1), a peak exists when the delay time $\tau$ is zero, and a range side lobe exists when the delay time $\tau$ is not zero. Similarly, as shown in FIG. 15(b), in the result $R_{bb}(t)$ of the autocorrelation calculation of the other complementary code sequence $b_n$ derived in accordance with Exp. (2), a peak exists when the delay time τ is zero, and a range side lobe exists when the delay time τ is not zero.

As shown in FIG. 15(b), in the additional value of the results ($R_{aa}(t)$, $R_{bb}(t)$) of the autocorrelation calculations, a peak exists when the delay time (or the shift time) τ is zero (hereinafter, the peak when the delay time τ is zero is referred to as the main lobe), and a range side lobe does not exist and is zero when the delay time τ is not zero. This is expressed by Exp. (3). In FIGS. 15(a) to (c), the abscissa indicates the delay time τ) in the autocorrelation calculation, and the ordinate indicates the calculated result of the autocorrelation calculation.

[Exp. 3]

$$R_{aa}(\tau)+R_{bb}(\tau) \neq 0, \text{ when } \tau=0$$

$$R_{aa}(\tau)+R_{bb}(\tau)=0, \text{ when } \tau \neq 0 \quad (3)]$$

Consequently, furthermore, a pulse compression radar has been known which, as shown in FIG. 16, transmits in a time divisional manner a radio frequency transmission signal that is generated based on the above-described complementary code an, and a radio frequency transmission signal that is generated based on the complementary code bn, while switching over the signals in each predetermined transmission period. FIG. 16 is a view illustrating transmission periods $T_r$ in a conventional pulse compression radar, and the complementary codes $a_n$, b which are used in transmission in the transmission periods. When a target moves in the case of reception in such a conventional pulse compression radar, the received reception signal is affected by a phase change θ(t) shown in Exp. (4) due to a Doppler frequency $f_d$ that is generated in accordance with the movement. The parameter t represents the time.

[Exp. 4]

$$\theta(t)=2\pi \times f_d \times t \quad (4)$$

In a state where an influence of such a phase change θ(t) is exerted, there arises a problem in that the range side lobe level in the autocorrelation characteristics of the reception signal is not zero, and the low range side lobe characteristics in the autocorrelation characteristics of the reception signal are not realized.

This problem will be specifically described with reference to FIG. 16. In FIG. 16, the transmission interval of transmitting the radio frequency transmission signals which are generated based on the complementary codes $a_n$, $b_n$, respectively is set as the transmission period $T_r$. In this case, after the transmission of the radio frequency transmission signal which is generated based on the complementary code an, the signal of the reflected wave with respect to the radio frequency transmission signal which is generated based on the complementary code $b_n$ is received during the next transmission period $T_r$. However, the signal of the reflected wave undergoes the phase change θ(t) shown in Exp. 4.

Depending on the magnitude of the product of the transmission period $T_r$ and the Doppler frequency $f_d$ contained in the reflected wave signal, therefore, the above-described ideal low range side lobe characteristics are hardly obtained, and the low range side lobe characteristics are impaired. In FIG. 16, the parameter $T_p$ indicates the transmission time per pulse corresponding to a pulse code having the code length L. The parameter $T_c$ indicates the transmission time in a transmission zone of the radio frequency transmission signal that is generated based on the complementary code $a_n$ or $b_n$ having the code length L. Exp. (5) holds among the parameter $T_p$, the parameter $T_c$, and the parameter L.

[Exp. 5]

$$T_c=T_p \times K \quad (5)$$

Patent Document 1 is known in connection with the above-discussed problem, i.e., the problem in that, when the radio frequency transmission signals that are generated based on the complementary codes $a_n$, $b_n$, respectively are switchingly transmitted in a time divisional manner, the low range side lobe characteristics is impaired due to the Doppler frequency $f_d$.

The dispersion/compression type pulse echo system transmitter/receiver shown in Patent Document 1 transmits radio frequency signals which are modulated by code sequences of different pulse compression code sequences in accordance with modes (a B mode and a Doppler mode). Specifically, in the B mode, the transmitter/receiver transmits a radio frequency signal which is modulated by a compression code sequence for a short distance range. In the Doppler mode, the transmitter/receiver transmits a radio frequency transmission signal which is modulated by a Barker code sequence, an M sequence, or the like. According to the configuration, transmission pulses are selectively used in accordance with the measurement target, and a pulse echo caused by a fast moving target which is at a short distance can be reduced.

PRIOR ART REFERENCE

Patent Document

Patent Document 1: JP-A-1-303135

BRIEF SUMMARY

Problems that the Invention is to Solve

In a conventional radar device, because of the above-discussed problem, however, there is a case where the main lobe of a signal of a reflected wave from a target which exists at a position relatively remote from the radar device is buried in the range side lobe of a signal of a reflected wave from a target which exists at a relatively close position. In the conventional radar device, in this case, the accuracy of detection of the target which exists at the remote position is impaired. Therefore, the above-discussed problem largely affects the measurement performance of a radar device.

In above-described Patent Document 1, the pulse compression is performed while alternately switching over the complementary code sequence used in the B mode, and the M sequence code, Barker code sequence, or the like used in the Doppler mode. In Patent Document 1, however, the impairment of the side lobe level which occurs in the transmission using complementary codes in the case where a target moves is not considered, and depends on characteristics of the side lobe level of the M sequence code, the Barker code sequence, or the like. In the case where the M sequence code or the Barker code sequence is used, with respect to a Barker code sequence having a code length L, the peak side lobe is about 20 Log(L). Even in the case of the maximum code length of 13 which is known as a Barker code, therefore, the peak side lobe is about 22.3 [dB], and hence affects the measurement performance of a radar device.

In the case where a target which exists at a position relatively close to the radar device, for example, within 5 m moves, the peak side lobe level with respect to a signal of a reflected wave from the target is equivalent to the main lobe with respect to a signal of a reflected wave from a remote target which is separated by, for example, 20 m. This shows that the above-discussed program is not solved also by Patent Document 1, and remains to largely affect the measurement performance of the radar device.

The invention has been conducted in view of the above-discussed conventional circumstances. It is an object of the invention to provide a radar device in which, even when a target moves, the low range side lobe characteristics of a signal of a reflected wave from the target is maintained, and the range side lobe level is effectively suppressed, thereby suppressing impairment of the separation performance in detection of a plurality of targets.

Means for Solving the Problems

The invention is directed to the above-described radar device including: a code generator which generates a first code sequence and a second code sequence constituting a pair of complementary codes, a first modulator which modulates the first code sequence to generate a first transmission signal, a second modulator which modulates the second code sequence to generate a second transmission signal, a quadrature modulator which performs quadrature modulation by using the first transmission signal and the second transmission signal that are generated by the first modulator and the second modulator, respectively, an amplifier which generates a radio frequency transmission signal from a signal that is quadrature modulated by the quadrature modulator, and an antenna which transmits the radio frequency transmission signal from a transmission antenna.

Effects of the Invention

According to the radar device of the invention, even when a target moves, the low range side lobe characteristics of a signal of a reflected wave from the target is maintained, and the range side lobe level is effectively suppressed, whereby impairment of the separation performance in detection of a plurality of targets can be suppressed.

BRIEF DESCRIPTION OF THE SEVERAL VIEWS OF THE DRAWINGS

FIG. 14 is a view showing a procedure of producing a code sequence of usual complementary codes.

DETAILED DESCRIPTION

Hereinafter, embodiments of the invention will be described with reference to the drawings. In the following description, a reception signal which is received by the radar device of the invention contains a signal of a reflected wave which is obtained by reflecting a radio frequency transmission signal transmitted from the radar device, from a target, and noise signals in the periphery of the radar device.

First Embodiment

Figure 1:
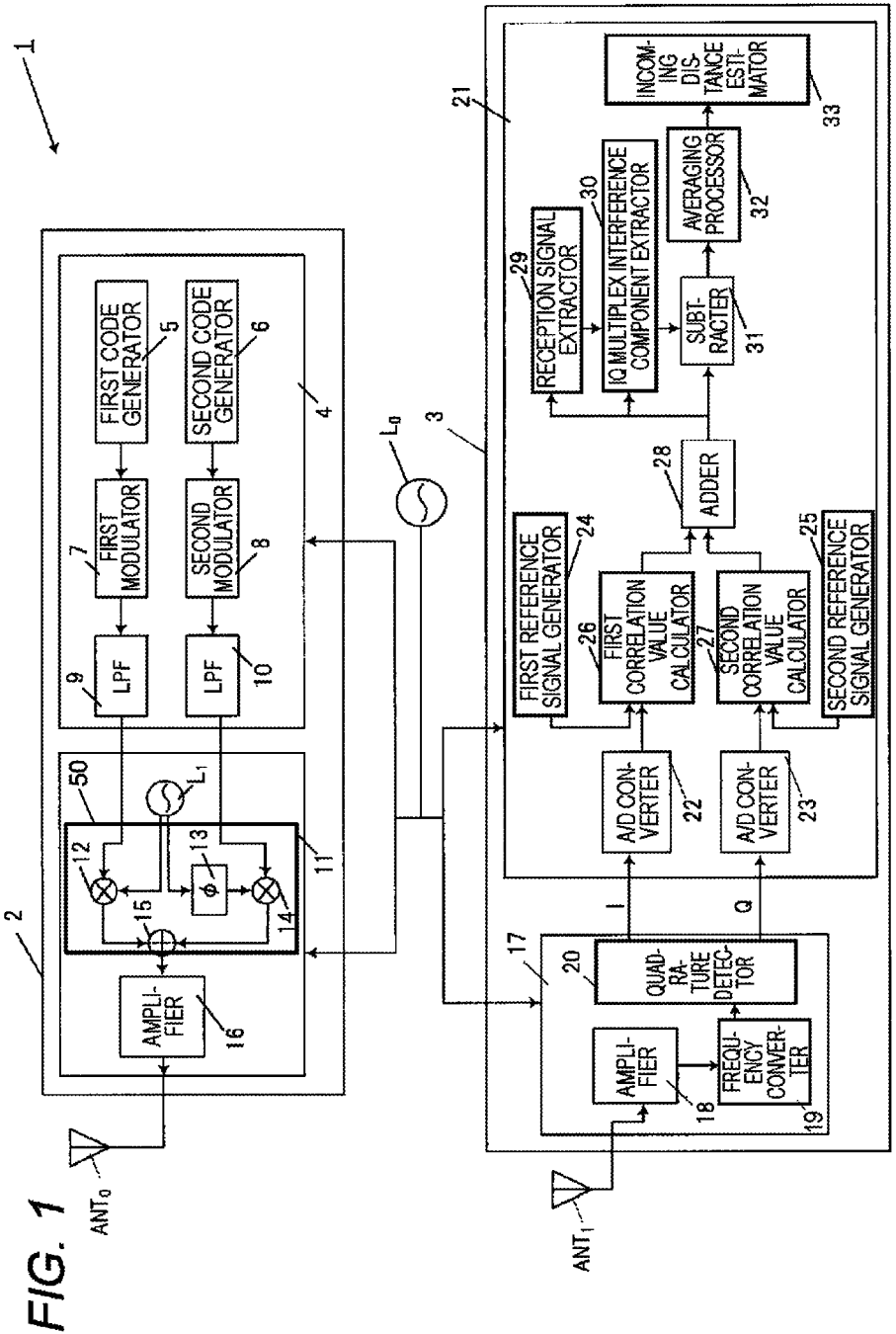
FIG. 1 is a block diagram showing the internal configuration of a radar device of a first embodiment.
Figure 2:
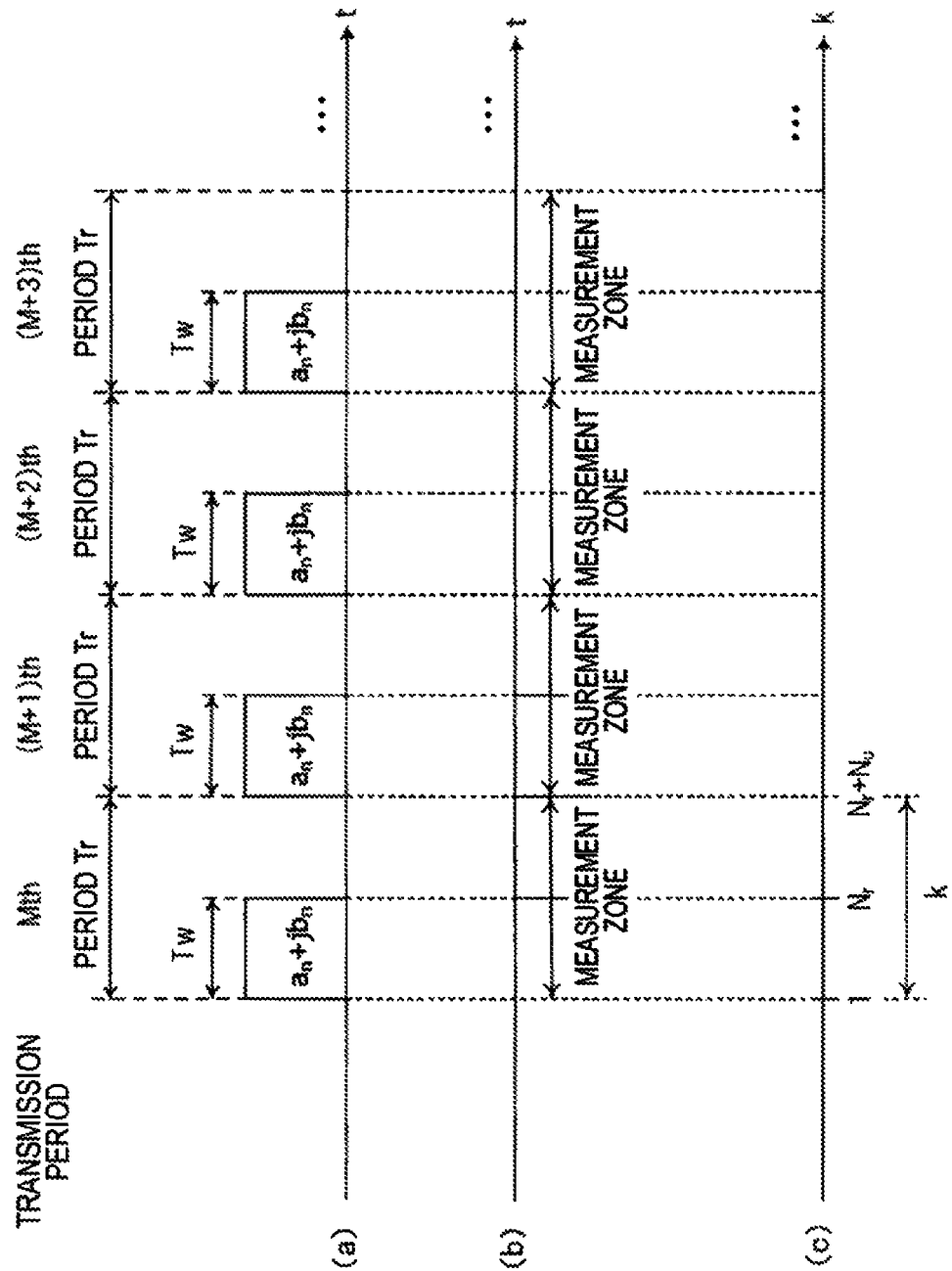
FIG. 2 shows timing charts related to the operation of the radar device of the first embodiment, (a) is a view illustrating transmission periods $T_r$, and transmission codes used in the transmission periods $T_r$, (b) is a view illustrating measurement zones, and (c) is a view illustrating relationships between the transmission periods $T_r$ and a discrete time k.

The configuration and operation of a radar device 1 of a first embodiment will be described with reference to FIGS. 1 to 4. FIG. 1 is a block diagram showing the internal configuration of the radar device 1 of the first embodiment. FIG. 2 shows timing charts related to the operation of the radar device 1 of the first embodiment, (a) of the figure is a view illustrating transmission periods $T_r$ and transmission codes used in the transmission periods $T_r$, (b) of the figure is a view illustrating measurement zones, and (c) of the figure is a view illustrating relationships between the transmission periods $T_r$ and a discrete time k.

Figure 3:
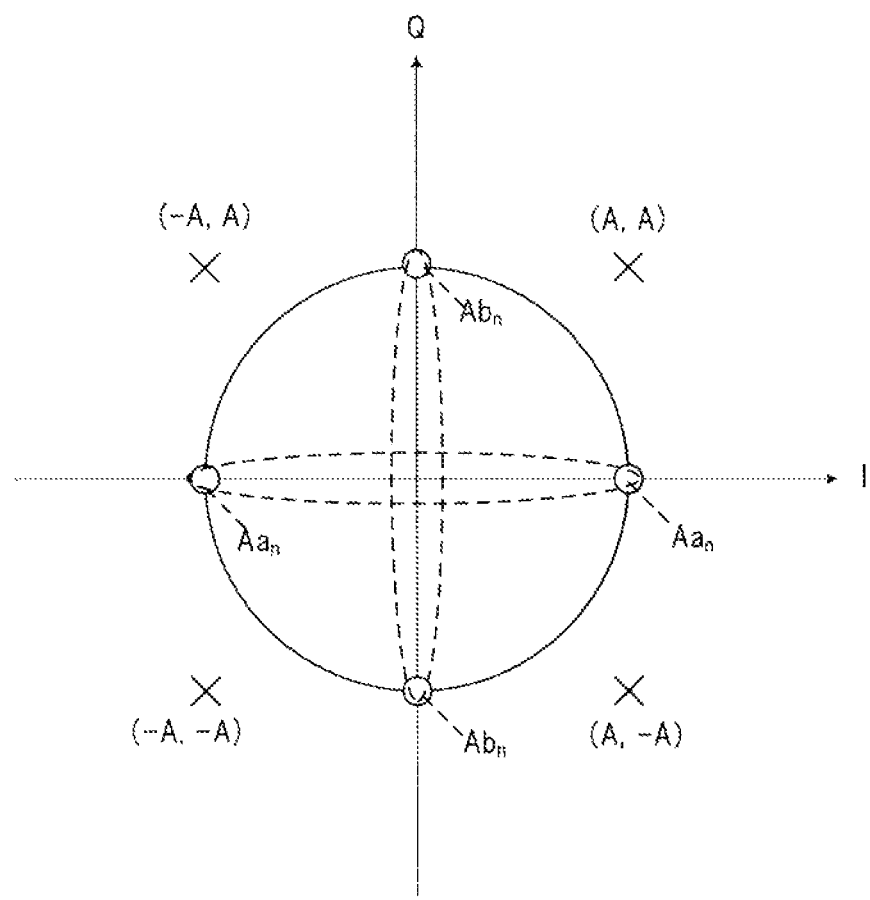
FIG. 3 is a constellation diagram of a radio frequency transmission signal which is IQ multiplexed in the radar device of the first embodiment.
Figure 4:
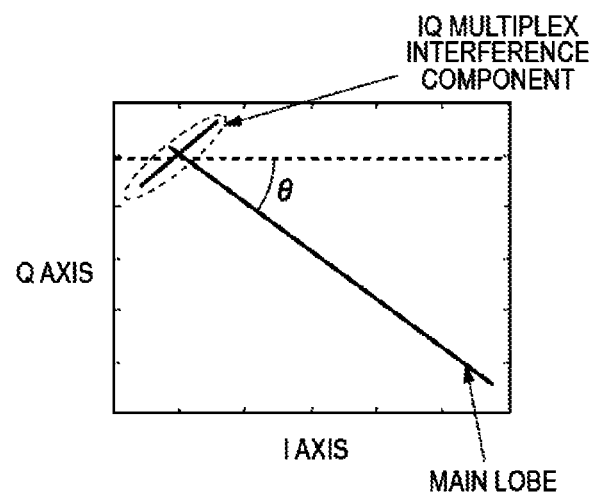
FIG. 4 shows views showing an IQ correlation value AC(k) on an IQ plane, (a) is a view showing an IQ correlation value AC(k) before an subtraction process by a subtracter, (b) is a view showing the IQ correlation value AC(k) which is used in the subtraction process by the subtracter, and (c) is a view showing relationships between the discrete time k and the absolute value |AC(k)| of the IQ correlation value AC(k).
Figure 4:
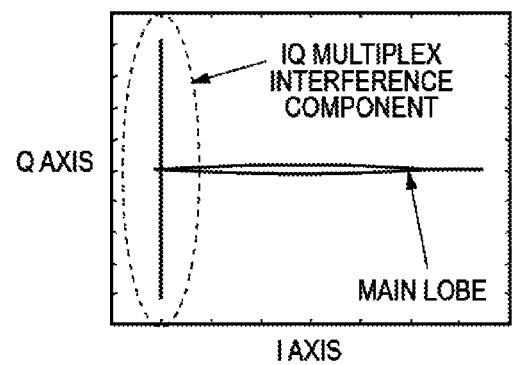
Figure 4:
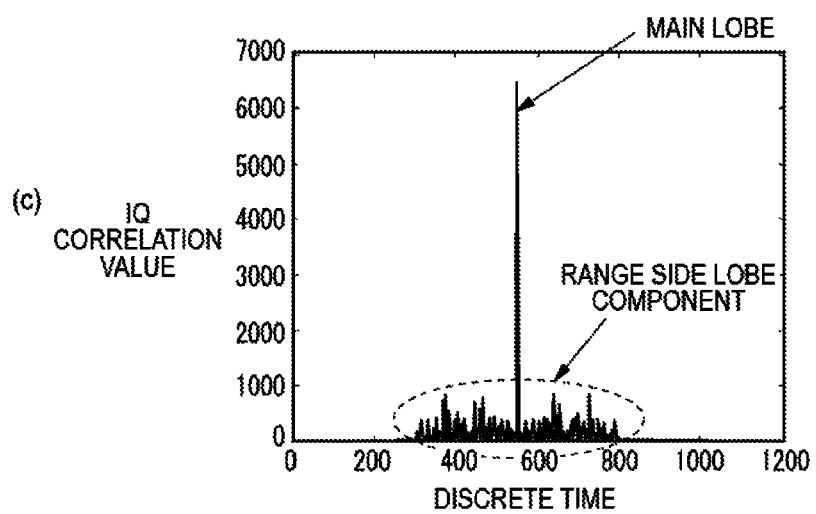

FIG. 3 is a constellation diagram of a radio frequency transmission signal which is IQ multiplexed in the radar device 1 of the first embodiment. FIG. 4 shows views showing an IQ correlation value AC(k) on an IQ plane, (a) of the figure is a view showing an IQ correlation value AC(k) before an subtraction process by a subtracter 31, (b) of the figure is a view showing the IQ correlation value AC(k) which is used in the subtraction process by the subtracter 31, and (c) of the figure is a view showing relationships between the discrete time k and the absolute value AC(k) of the IQ correlation value AC(k).

As shown in FIG. 1, the radar device 1 includes a reference oscillator $L_0$, a radar transmitter 2 to which a transmission antenna $ANT_0$ is connected, and a radar receiver 3 to which a reception antenna $ANT_1$ is connected. The radar device 1 transmits a predetermined intermittent radio frequency transmission signal which is generated by the radar transmitter 2, from the transmission antenna $ANT_0$, and receives the signal of the reflected wave which is reflected from the target, through the radar receiver 3. The radar device 1 performs signal processing on the reception signal which is received through the radar receiver 3, to detect the presence or absence of a target. The target is an object which is to be detected by the radar device 1, and for example an automobile or a person. This is applicable similarly in the following embodiments.

The radar transmitter 2 will be described. The radar transmitter 2 includes a transmission signal generator 4, and an RF (Radio Frequency) transmitter 11. The transmission signal generator 4 includes a first code generator 5, a second code generator 6, a first modulator 7, a second modulator 8, an LPF (Low Pass Filter) 9, and an LPF 10. In FIG. 1, the transmission signal generator 4 is configured so as to include the LPF 9 and the LPF 10. Alternatively, the LPF 9 and the LPF 10 may be configured in the radar transmitter 2 independently from the transmission signal generator 4. The RF transmitter 11 includes a local oscillator $L_1$, a mixer 12, a first phase shifter 13, a mixer 14, an adder 15, and an amplifier 16.

Based on a reference signal generated by the reference oscillator $L_0$, the transmission signal generator 4 generates a signal which is obtained by multiplying the reference signal a predetermined number of times. The sections of the transmission signal generator 4 operate based on the generated signal. The transmission signal generator 4 modulates pulse compression codes of complementary code sequences $a_n$, $b_n$ each having a code length of L to periodically generate a base-band transmission signal. Here, n=1, . . . , L, and the parameter L indicates the code length of the complementary code sequences $a_n$, $b_n$.

It is assumed that the transmission signal generated by the transmission signal generator 4 is not a continuous signal. As shown in FIG. 2(*a*), in transmission zones $T_w$ [s] of M-th to (M+3)-th transmission periods $T_r$, for example, an $N_0$ [number] of samples exist per pulse code with respect of the complementary code sequences $a_n$, $b_n$ having a code length of L. The parameter M is a natural number. Therefore, an $N_r$ (=$N_0 \times L$) number of samples are contained in the transmission zone $T_w$. It is assumed that, in the non-transmission zone ($T_r - T_w$) [s] of the M-th to (M+3)-th transmission periods $T_r$, an $N_u$ [number] of samples exist as the base-band transmission signal.

First, the configurations of the sections of the transmission signal generator 4*a* will be described.

The first code generator 5 generates a transmission code for pulse compression of the complementary code sequence $a_n$ which is a pair of complementary code sequences having the code length of L. The first code generator 5 outputs the generated transmission code of the complementary code sequence $a_n$ to the first modulator 7. Hereinafter, the transmission code of the complementary code sequence $a_n$ is referred to as the transmission code an for the sake of convenience.

The second code generator 6 generates a transmission code for pulse compression of the complementary code sequence $b_n$ which is a pair of complementary code sequences having the code length of L. The second code generator 6 outputs the generated transmission code of the complementary code sequence $b_n$ to the second modulator 8. Hereinafter, the transmission code of the complementary code sequence $b_n$ is referred to as the transmission code $b_n$ for the sake of convenience.

The first modulator 7 receives the transmission code an output from the first code generator 5. The first modulator 7 performs pulse modulation (amplitude modulation, ASK (Amplitude Shift Keying)) or phase modulation (PSK (Phase Shift Keying)) on the input transmission code an to generate a base-band transmission signal I(k). The first modulator 7 outputs a transmission signal I(k) which is equal to or lower than a preset limit band in the generated transmission signal I(k), to the RF transmitter 11 through the LPF 9.

The second modulator 8 receives the transmission code $b_n$ output from the second code generator 6. The second modulator 8 performs pulse modulation (amplitude modulation, ASK) or phase modulation (PSK) on the input transmission code $b_n$ to generate a base-band transmission signal Q(k). The second modulator 8 outputs a transmission signal Q(k) which is equal to or lower than a preset limit band in the generated transmission signal Q(k), to the RF transmitter 11 through the LPF 10.

Based on the reference signal generated by the reference oscillator $L_0$, the RF transmitter 11 generates a signal which is obtained by multiplying the reference signal a predetermined number of times. The RF transmitter 11 operates based on the generated signal.

The RF transmitter 11 allocates the transmission signal I(k) output from the first modulator 7 to the I axis of the IQ plane shown in FIG. 3. Furthermore, the RF transmitter 11 allocates the transmission signal Q(k) output from the second modulator 8 to the Q axis of the IQ plane shown in FIG. 3. The RF transmitter 11 additionally multiplexes the transmission signal I(k) allocated to the I axis and the transmission signal Q(k) allocated to the Q axis. In the following description, the process of allocating the transmission signal I(k) output from the first modulator 7 to the I axis, and the transmission signal Q(k) output from the second modulator 8 to the Q axis, and additionally multiplexing the transmission signals I(k) and Q(k) to generate a radio frequency transmission signal is referred to as "IQ multiplex".

The contents of the process of the IQ multiplex will be specifically described. In the RF transmitter 11, the IQ multiplex is performed by the mixer 12, the first phase shifter 13, the mixer 14, and the adder 15. In the following embodiments, the mixer 12, the first phase shifter 13, the mixer 14, and the adder 15 may be referred to as the quadrature modulator 50 which performs the IQ multiplex.

In the mixer 12, the transmission signal I(k) output from the first modulator 7 is multiplied with a signal $A \cos(2\pi f_c t)$ supplied from the local oscillator $L_1$ operating at a carrier frequency of $f_c$. The parameter A indicates a predetermined amplitude value. The parameter t indicate the continuous time (analog time), and is related with the above-described discrete time k by t=k×Ts where Ts $(=T_w/N_r)$ indicates the sampling period.

In the mixer 14, the transmission signal Q(k) output from the second modulator 8 is multiplied with a signal $A \sin(2\pi f_c t)$ which is obtained by phase-shifting the signal $A \cos(2\pi f_c t)$ supplied from the local oscillator $L_1$ of the carrier frequency of $f_c$ by 90 degrees by the first phase shifter 13. The signals which are results of the multiplications in the mixers 12, 14 are added to each other in the adder 15. As a result, a quadrature modulated radio frequency transmission signal s(t) shown in Exp. (6) is generated by IQ multiplex of the complementary codes $a_n$, $b_n$.

[Exp. 6]

$$s(t) = A[I(t)\cos(2\pi f_c t) + Q(t)\sin(2\pi f_c t)] \quad (6)$$

The constellation diagram shown in FIG. 3 is a constellation diagram of a radio frequency transmission signal which is IQ multiplexed while the transmission code an is allocated to the I axis, and the transmission code $b_n$ is allocated to the Q axis. Therefore, the radio frequency transmission signal s(t) shown in Exp. (6) is a signal which is generated by IQ multiplexing the transmission code an and the transmission code $b_n$ so that one of signal points (A, A), (A, −A), (−A, A), and (−A, −A) shown in FIG. 3 is selected.

The amplifier 16 receives the radio frequency transmission signal s(t) which is generated in accordance with Exp. (6), amplifies the level of the input radio frequency transmission signal s(t) to a predetermined level, and supplies the amplified signal to the transmission antenna $ANT_0$. The amplified radio frequency transmission signal s(t) is transmitted so as to be radiated into the space through the transmission antenna $ANT_0$.

The transmission antenna $ANT_0$ transmits the radio frequency transmission signal s(t) which is output from the RF transmitter 11, so as to radiate the signal into the space. As shown in FIG. 2(a), the radio frequency transmission signal s(t) is transmitted during the transmission zone $T_w$ in the transmission period $T_r$, but not transmitted during the non-transmission zone $(T_r - T_w)$.

Next, the configurations of the sections of the radar receiver 3 will be described.

The radar receiver 3 includes a reception antenna $ANT_1$, an RF receiver 17, and a signal processor 21. The RF receiver 17 includes an amplifier 18, a frequency converter 19, and a quadrature detector 20. The signal processor 21 includes A/D converters 22, 23, first and second reference signal generators 24, 25, first and second correlation value calculators 26, 27, an adder 28, a reception signal extractor 29, an IQ multiplex interference component extractor 30, a subtracter 31, an averaging processor 32, and an incoming distance estimator 33.

The radar receiver 3 periodically calculates the transmission periods $T_r$ as signal processing zones in the signal processor 21.

The reception antenna $ANT_1$ receives a signal of a reflected wave which is generated by reflecting the radio frequency transmission signal s(t) transmitted from the radar transmitter 2, from a target, and noise signals in the periphery of the radar device 1, as the reception signal. The signal of the reflected wave signal is a signal in the radio frequency band. The reception signal which is received by the reception antenna $ANT_1$ is supplied to the RF receiver 17. In the radar device 1, the radar receiver 3 holds the one reception antenna $ANT_1$.

As shown in FIG. 2(b), the reception antenna $ANT_1$ receives the above-described reception signal in zones corresponding to the transmission periods $T_r$. Therefore, the zones $T_r$ where the reception signal is received are set as measurement zones in the radar device 1.

Similarly with the RF transmitter 11, based on the reference signal generated by the reference oscillator $L_0$, the RF receiver 17 generates a signal which is obtained by multiplying the reference signal the predetermined number of times. The RF receiver 17 operates based on the generated signal. Therefore, the local oscillator $L_1$ of the RF transmitter 11 can be synchronized with a local oscillator (not shown) of the RF receiver 17.

The amplifier 18 receives the radio frequency band signal which is received by the reception antenna $ANT_1$, amplifies the level of the input radio frequency band signal, and supplies the amplified signal to the frequency converter 19.

The frequency converter 19 receives the radio frequency band signal which is output from the amplifier 18, down-converts the input radio frequency band signal to the base band, and supplies the down-converted reception signal to the quadrature detector 20.

The quadrature detector 20 performs quadrature detection on the base-band reception signal supplied from the frequency converter 19 to generate a base-band reception signal configured by an in-phase signal and a Quadrate signal. The quadrature detector 20 outputs the in-phase signal component in the generated reception signal to the A/D converter 22, and the quadrate signal component in the generated reception signal to the A/D converter 23.

The A/D converter 22 performs sampling at the discrete time k on the base-band in-phase signal supplied from the quadrature detector 20, and converts the in-phase signal which constitutes analog data, to digital data. The A/D converter 22 outputs the in-phase signal which is converted to digital data, to the first correlation value calculator 26.

Similarly, the A/D converter 23 performs sampling at the discrete time k on the base-band quadrate signal supplied from the quadrature detector 20, and converts the quadrate signal which constitutes analog data, to digital data. The A/D converter 23 outputs the quadrate signal which is converted to digital data, to the second correlation value calculator 27. Here, the parameter k indicates the discrete time corresponding to the sample number of the base-band transmission signals I(k), Q(k) from which the radio frequency transmission signal that is transmitted in the reception periods $T_r$ shown in FIG. 2(a) originates.

Moreover, the reception signal which is converted by the A/D converters 22, 23, and which is at the discrete time k is indicated as a complex signal of Exp. (7) by using the in-phase signal I(k) of the reception signal and the quadrate signal Q(k) of the reception signal. Here, j is an imaginary unit satisfying $j^2 = -1$. In the following description, the discrete time k is k=1 to $(N_r+N_u)$. The range of the discrete time k is similarly applicable also in the following embodiments.

[Exp. 7]

$$x(k)=I(k)+jQ(k) \quad (7)$$

As shown in FIG. 2(c), the discrete time of k=1 shows the starting timing of the transmission zone $T_w$ in the transmission period $T_r$ of the radio frequency transmission signal s(t) which is generated by IQ multiplex of the transmission code an and the transmission code bn. The discrete time of k=$N_r$ shows the ending timing of the transmission zone $T_w$ in the transmission period $T_r$ of the radio frequency transmission signal s(t) which is generated by IQ multiplex of the transmission code an and the transmission code bn. Moreover, The discrete time of k=$(N_r+N_u)$ shows the timing immediately before the ending of the transmission period $T_r$ of the radio frequency transmission signal s(t) which is generated by IQ multiplex of the transmission code an and the transmission code $b_n$. In FIG. 2(c), in order to conveniently illustrate the range of the discrete time k, the range of the discrete time k is shown only in the M-th transmission period.

In synchronization with the operation of the transmission signal generator 4, based on the reference signal generated by the reference oscillator $L_0$ in a similar manner as in the transmission signal generator 4, the first reference signal generator 24 generates a signal which is obtained by multiplying the reference signal a predetermined number of times. Based on the generated signal, the first reference signal generator 24 generates a first reference transmission signal I(k) of the same base band as the transmission signal I(k) generated by the first modulator 7. The first reference signal generator 24 outputs the generated first reference transmission signal I(k) to the first correlation value calculator 26. In FIG. 1, the input of the reference signal to the first reference signal generator 24 is not shown.

In synchronization with the operation of the transmission signal generator 4, based on the reference signal generated by the reference oscillator $L_0$ in a similar manner as in the transmission signal generator 4, the second reference signal generator 25 generates a signal which is obtained by multiplying the reference signal the predetermined number of times. Based on the generated signal, the second reference signal generator 25 periodically generates a second reference transmission signal jQ(k) which is obtained by applying Q-axis phase rotation in the IQ multiplex to the transmission signal Q(k) of the same base band as the transmission signal Q(k) generated by the second modulator 8. The second reference signal generator 25 outputs the generated second reference transmission signal jQ(k) to the second correlation value calculator 27. In FIG. 1, the input of the reference signal to the second reference signal generator 25 is not shown.

The first correlation value calculator 26 receives the complex signal x(k) of the digital data output from the A/D converter 22, and the first reference transmission signal I(k) output from the first reference signal generator 24. The first correlation value calculator 26 calculates a first correlation value $AC_1(k)$ of the input complex signal x(k) and the first reference transmission signal I(k). The symbol of * (asterisk) represents a complex conjugate operator.

Specifically, in the case of the discrete time k=1 to $(N_r+N_u)$, the first correlation value calculator 26 calculates the first correlation value $AC_1(k)$ in accordance with Exp. (8). The first correlation value calculator 26 outputs the first correlation value $AC_1(k)$ which is calculated in accordance with Exp. (8), to the adder 28.

[Exp. 8]

$$AC_1(k) = \sum_{m=1}^{N_r} x(k+m-1)I^*(m) \quad (8)$$

The second correlation value calculator 27 receives the complex signal x(k) of the digital data output from the A/D converter 23, and the second reference transmission signal jQ(k) output from the second reference signal generator 25. The second correlation value calculator 27 calculates a second correlation value $AC_2(k)$ of the input complex signal x(k) and the second reference transmission signal jQ(k). The symbol of * (asterisk) represents a complex conjugate operator.

Specifically, in the case of the discrete time k=1 to $(N_r+N_u)$, the second correlation value calculator 27 calculates the second correlation value $AC_2(k)$ in accordance with Exp. (9). The second correlation value calculator 27 outputs the second correlation value $AC_2(k)$ which is calculated in accordance with Exp. (9), to the adder 28.

[Exp. 9]

$$AC_2(k) = \sum_{m=1}^{N_r} x(k+m-1)[jQ(m)]^* \quad (9)$$

As described above, each of the calculations of the first correlation value calculator 26 and the second correlation value calculator 27 is performed on the discrete time k=1 to $(N_r+N_u)$. Depending on the existing range of the target which is the measurement object of the radar device, the measurement range (the range of k) may be further limited.

As a result, the radar device 1 can reduce the calculation amounts of the first correlation value calculator 26 and the second correlation value calculator 27. Namely, the radar device 1 can reduce the power consumption due to the reduction of the calculation amounts by the signal processor 21.

The adder 28 receives the first correlation value $AC_1(k)$ output from the first correlation value calculator 26, and the second correlation value $AC_2(k)$ output from the second correlation value calculator 27. The adder 28 adds together the input first correlation value $AC_1(k)$ and second correlation value $AC_2(k)$ in a state where the discrete times k are coincident with each other, as shown in Exp. (10) to calculate a third correlation value AC(k). In the following description, the third correlation value calculated by the adder 28 is referred to as "IQ correlation value". The adder 28 outputs the calculated IQ correlation value AC(k) to the reception signal extractor 29 and the subtracter 31.

[Exp. 10]

$$AC(k)=AC_1(k)+AC_2(k) \quad (10)$$

As the first correlation value calculator 26 and the second correlation value calculator 27, for example, the complementary code fast correlator disclosed in following Reference Non-patent Document 1 may be referenced and applied. This is applicable similarly in the following embodiments.

(Reference Non-patent Document 1) S. Z. Budisin, "Efficient Pulse Compressor for Golay complementary Sequences", Electronics Letters 31st, Vol. 27, No. 3, (January 1991)

The reception signal extractor 29 receives the IQ correlation value AC(k) output from the adder 28. The reception signal extractor 29 extracts an IQ correlation value $AC(k_{pq})$ which exceeds a preset predetermined threshold B, from the input IQ correlation value $AC(k)$.

Namely, the reception signal extractor 29 extracts discrete times $k_{pq}$ satisfying Exp. (11), and outputs IQ correlation values $AC(k_{p1}), AC(k_{p2}), \ldots, AC(k_{pv})$ in which IQ correlation values $AC(k_{pq})$ corresponding to the extracted discrete times $k_{pq}$ are arranged in descending order, to the IQ multiplex interference component extractor 30. The parameters p1, p2, ..., pv are natural numbers in the sample numbers 1 to $(N_r+N_u)$, and the ordinal numbers of the discrete times $k_{pq}$ corresponding to IQ correlation values $AC(k_{pq})$ satisfying Exp. (11). It is assumed that the parameter q is one of q=1, 2, ..., v. The parameter v is a natural number, and indicates the number of discrete times $k_{pq}$ satisfying Exp. (11).

[Exp. 11]

$$|AC(k_{pq})| \geq B| \quad (11)$$

Here, a predetermined threshold B is a level in which a predetermined margin (about 3 [dB] to 10 [dB]) is added to the noise level. In regard to the predetermined threshold B, this is applicable similarly in the following embodiments.

The IQ multiplex interference component extractor 30 receives the IQ correlation values $AC(k_{pq})$ output from the reception signal extractor 29. The IQ multiplex interference component extractor 30 calculates phase components $\theta(k_{pq})$ ($=\angle[AC(k_{pq})]$) of the input IQ correlation values $AC(k_{pq})$.

Based on the phase components $\theta(k_{pq})$ of the calculated IQ correlation values $AC(k_{pq})$, moreover, the IQ multiplex interference component extractor 30 calculates an IQ multiplex interference component in accordance with Exp. (12). In the expression, $Im\{x\}$ is an operator for extracting the imaginary component of a complex number x. The IQ multiplex interference component extractor 30 outputs the calculated IQ multiplex interference component to the subtracter 31.

[Exp. 12]

$$Im\{AC(k_{pq})\exp(-j\theta(k_{pq}))\} \quad (12)$$

The subtracter 31 receives the IQ multiplex interference component output from the IQ multiplex interference component extractor 30. As indicated in Exp. (13), the subtracter 31 removes (subtracts) the IQ multiplex interference component which is calculated based on Exp. (12), from the IQ correlation value $AC(k_{pq})$ which is extracted by the reception signal extractor 29, to derive a fourth correlation value $AC'(k_{pq})$ from which the IQ multiplex interference component is removed. Here, $k=k_{pq}-N_0L+1, k_{pq}, \ldots, k_{pq}+N_0L-1$. However, the case where k<1 or k>$(N_r+N_u)$ is not included in the range where the subtracting process is to be performed.

[Exp. 13]

$$AC'(k)=AC(k)-jIm(AC(k)\exp(-j\theta(k_{pq})))\exp(j\theta(k_{pq})) \quad (13)$$

The principle of the process of removing the IQ multiplex interference component in the subtracter 31 will be described with reference to FIG. 4. FIGS. 4(a) and 4(b) are views in which the IQ correlation value $AC(k)$ is plotted on the complex plane consisting of the I axis and the Q axis. FIG. 4(c) is a view where, in the case where the abscissa indicates the discrete time k, the absolute value $|AC(k)|$ of the IQ correlation value is plotted on the ordinate. As described above, in a certain transmission period $T_r$, the radar transmitter 2 transmits the radio frequency transmission signal s(t) which is generated by IQ multiplexing the transmission code an and transmission code $b_n$ that are complementary codes. Here, the transmission code an and the transmission code $b_n$ are not codes having orthogonality to each other, but are code having correlativity. In the case where the radio frequency transmission signal s(t) which is generated by IQ multiplexing the thus configured transmission codes $a_n$, $b_n$ is transmitted, an IQ multiplex interference component is generated in the signal of the reflected wave which is generated by reflecting the radio frequency transmission signal s(t) from a target.

In the case where a pair of complementary codes are IQ matrixed as in the first embodiment, as shown in FIG. 4(a), an IQ multiplex interference component appears as a peak range side lobe in a direction perpendicular to the peak direction $\theta(k_{pq})$ of the IQ correlation value $AC(k_{pq})$ satisfying Exp. (11) above in the IQ correlation value $AC(k)$ which is obtained by the adder 28 of the radar receiver 3. As shown in FIG. 4(c), the IQ multiplex interference component corresponds to the range side lobe component indicated in the portion enclosed by the broken line.

When the IQ multiplex interference component extractor 30 calculates the component (see Exp. (12)) perpendicular to the peak direction $\theta(k_{pq})$ of the IQ correlation value $AC(k_{pq})$, therefore, the range side lobe component which is indicated in the portion enclosed by the broken line in FIG. 4(b), and which is in the IQ correlation value $AC(k_{pq})$ can be extracted.

As indicated in Exp. (12), the phase rotation $\theta(k_{pq})$ is applied in order to extract the IQ multiplex interference component. In the second expression of the right-hand side of Exp. (13), therefore, a coefficient $\exp(j\theta(k_{pq}))$ is multiplied in order to obtain the original phase component.

As described above, $Im\{x\}$ of the second expression of the right-hand side of Exp. (13) is an operator for extracting the imaginary component of the complex number x. In order to return to the original imaginary component, the subtracter 31 multiples the complex coefficient j indicating application of the phase rotation of 90 degrees in the second expression of the right-hand side of Exp. (13).

From these, the subtracter 31 can remove the range side lobe component from the IQ correlation values $AC(k)$ extracted by the reception signal extractor 29, in accordance with Exp. (13).

The averaging processor 32 receives the fourth correlation value $AC'(k)$ which is derived by the subtracter 31. The averaging processor 32 averages the fourth correlation values $AC'(k)$ which are input in a predetermined plurality of transmission periods $T_r$. The averaging processor 32 outputs the average value of the averaged fourth correlation value $AC'(k)$ to the incoming distance estimator 33. As a result, the radar device 1 can suppress noise components in the periphery of the radar device 1, and improve the measurement performance related to estimation of the incoming angle and distance of the target.

The incoming distance estimator 33 receives the average value which is output from the averaging processor 32. The incoming distance estimator 33 performs a calculation of estimating the distance to the target, based on the input average value. The calculation of estimating the distance to the target in the incoming distance estimator 33 is a known technique, and can be realized by referring to, for example, following Reference Non-patent Document 2.

(Reference Non-patent Document 2) J. J. BUSSGANG, et al., "A Unified Analysis of Range Performance of CW, Pulse, and Pulse Doppler Rader", Proceedings of the IRE, Vol. 47, Issue 10, pp. 1753-1762 (1959)

Based on the fourth correlation value of the average value which is calculated by the averaging processor 32, for example, the incoming distance estimator 33 determines the time difference between the discrete time when the fourth correlation value has the maximum value, and the transmission time of the radio frequency transmission signal. Based on the determined time difference, moreover, the incoming distance estimator 33 estimates the distance to the target.

As described above, according to the radar device 1 of the first embodiment, even when a target moves, the low range side lobe characteristics of a signal of a reflected wave from the target is maintained, and the range side lobe level is effectively suppressed, thereby suppressing impairment of the separation performance in detection of a plurality of targets.

In Patent Document 1 above, in order to obtain a result of one pulse compression, the three kinds of code sequences, i.e., two kinds of codes constituting a pair of complementary code sequences, and one kind of code sequence such as a Barker code or an M code sequence are used, and therefore a time period corresponding to the three transmission periods must be required. By contrast, in the radar device 1 of the first embodiment, the transmission code an and the transmission code $b_n$ are IQ multiplexed in transmission, and therefore, in order to obtain a result of one measurement, a time period corresponding to one transmission period in total is required. According to the radar device 1, therefore, the number of measurements within a predetermined time period can be increased, and namely the measurement performance can be improved.

Second Embodiment

Next, the configuration and operation of a radar device $1a$ of a second embodiment will be described with reference to FIGS. 5 to 8.

Figure 5:
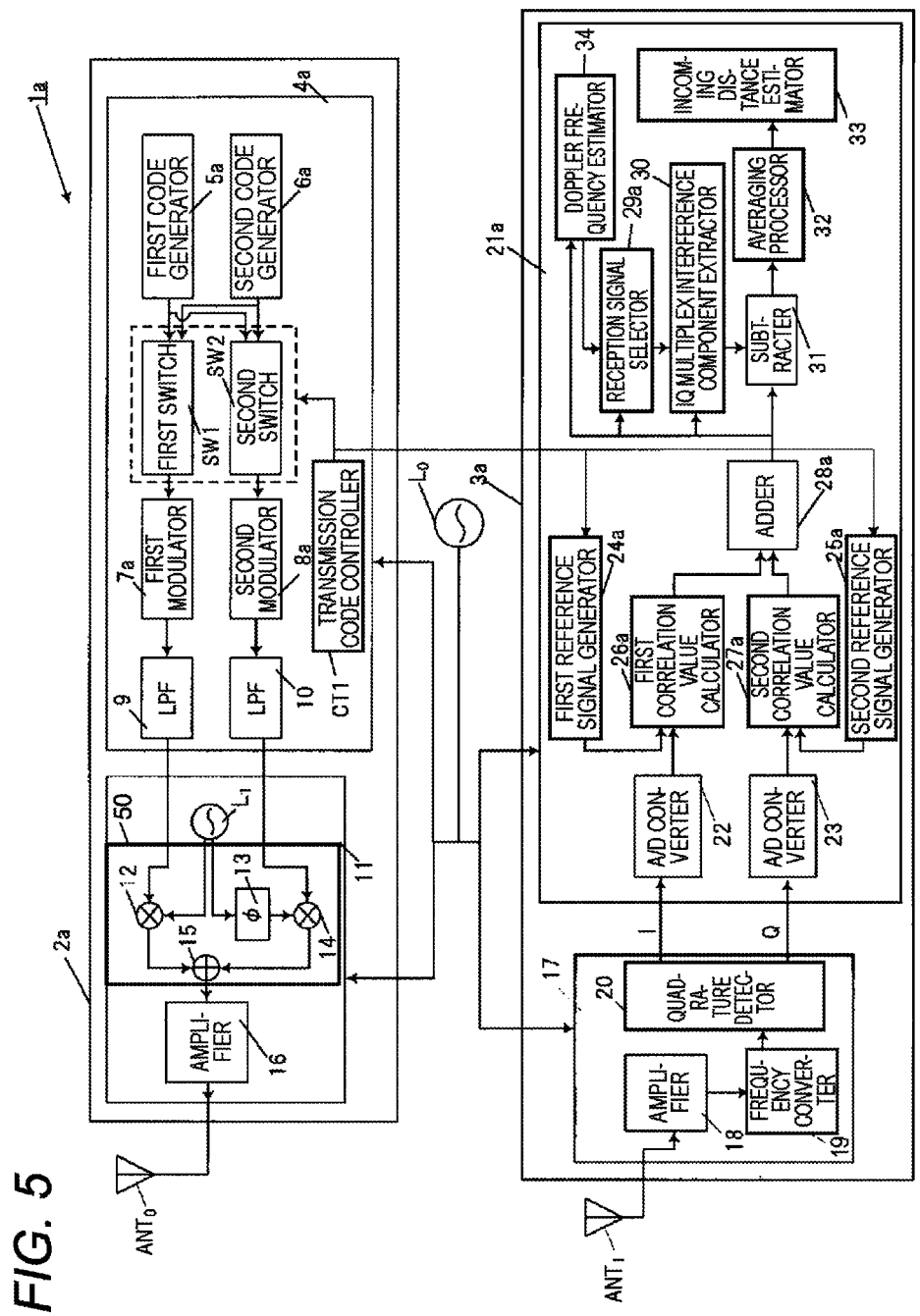
FIG. 5 is a block diagram showing the internal configuration of a radar device of a second embodiment.

FIG. 5 is a block diagram showing the internal configuration of the radar device $1a$ of the second embodiment.

Figure 6:
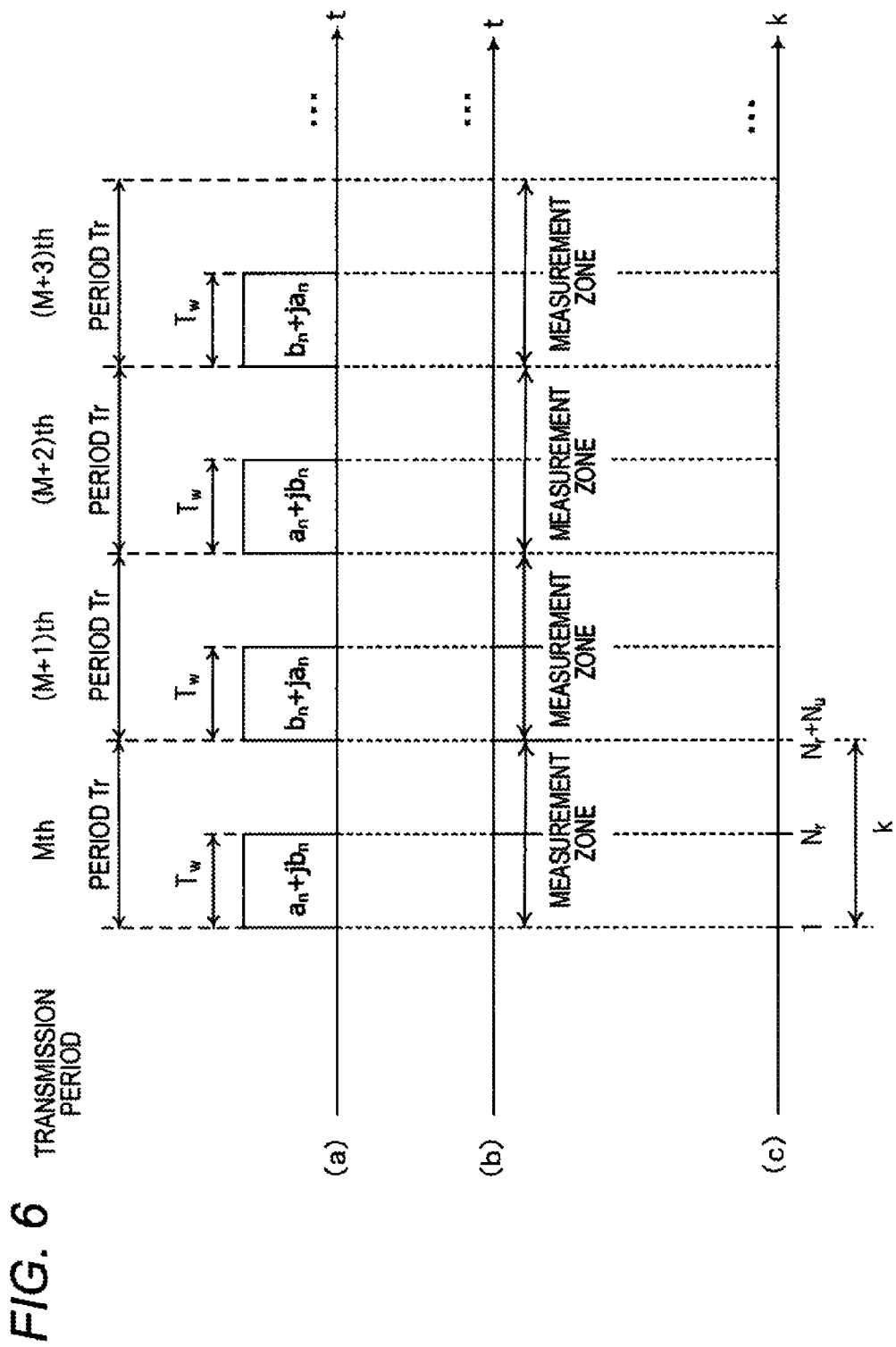
FIG. 6 shows timing charts related to the operation of the radar device of the second embodiment, (a) is a view illustrating transmission periods $T_r$, and transmission codes used in the transmission periods $T_r$, (b) is a view illustrating measurement zones, and (c) is a view illustrating relationships between the transmission periods $T_r$ and a discrete time k.

FIG. 6 shows timing charts related to the operation of the radar device $1a$ of the second embodiment, (a) of the figure is a view illustrating transmission periods $T_r$ and transmission codes used in the transmission periods $T_r$, (b) of the figure is a view illustrating measurement zones, and (c) of the figure is a view illustrating relationships between the transmission periods $T_r$ and a discrete time k.

Figure 7:
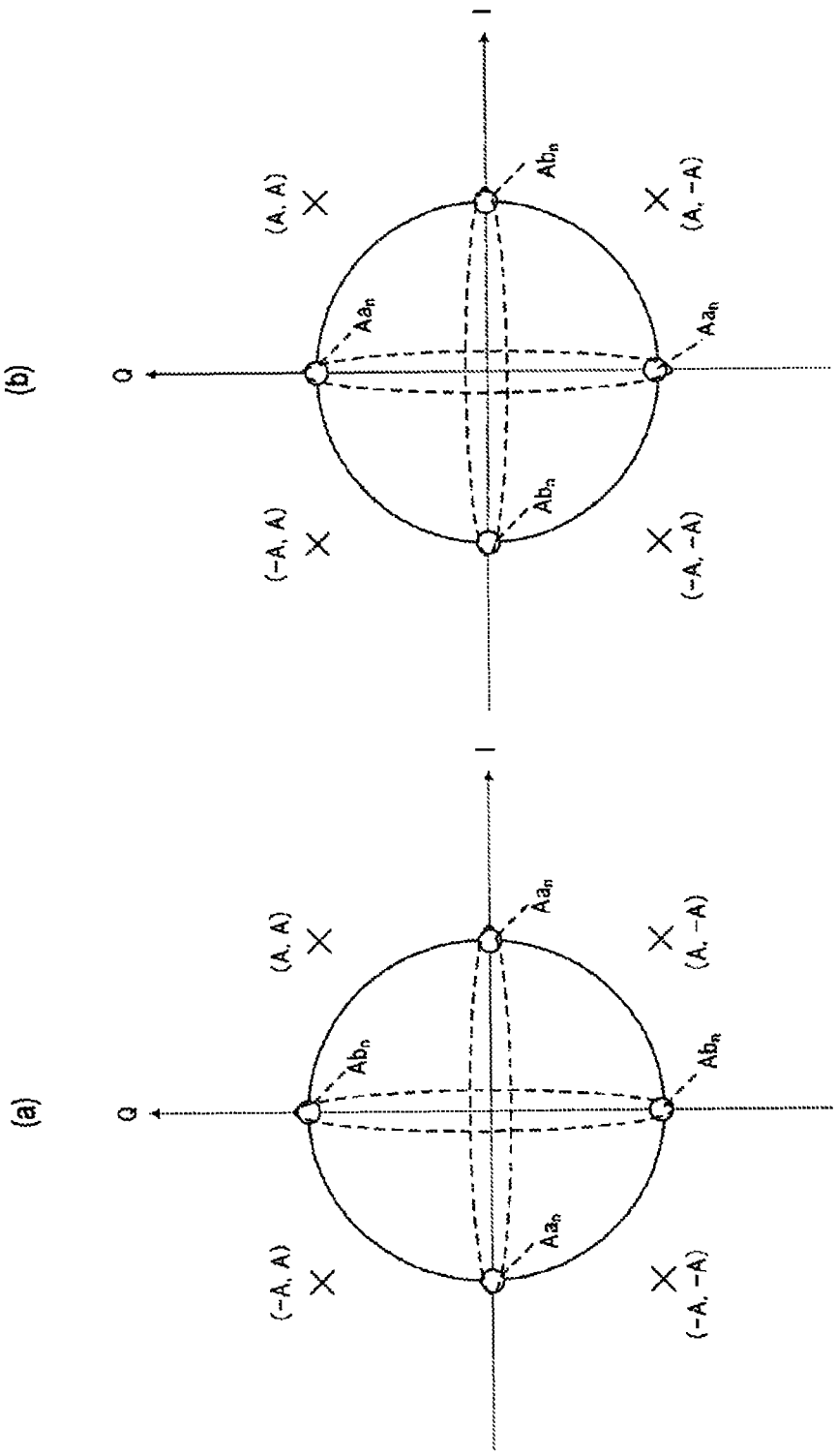
FIG. 7 shows constellation diagrams of radio frequency transmission signals which are IQ multiplexed in the radar device of the second embodiment, (a) is a constellation diagram of transmission signals which are IQ multiplexed in M-th and (M+2)-th transmission periods while an complementary code an is allocated to the I axis, and an complementary code $b_n$ is allocated to the Q axis, and (b) is a constellation diagram of transmission signals which are IQ multiplexed in (M+1)-th and (M+3)-th transmission periods while the complementary code $b_n$ is allocated to the I axis, and the complementary code an is allocated to the Q axis.

FIG. 7 shows constellation diagrams of transmission signals in the radar device $1a$ of the second embodiment, (a) of the figure is a constellation diagram of transmission signals which are IQ multiplexed while an complementary code an is allocated to the I axis, and an complementary code $b_n$ is allocated to the Q axis, and (b) of the figure is a constellation diagram of transmission signals which are IQ multiplexed in (M+1)-th and (M+3)-th transmission periods while the complementary code $b_n$ is allocated to the I axis, and the complementary code an is allocated to the Q axis.

Figure 8:
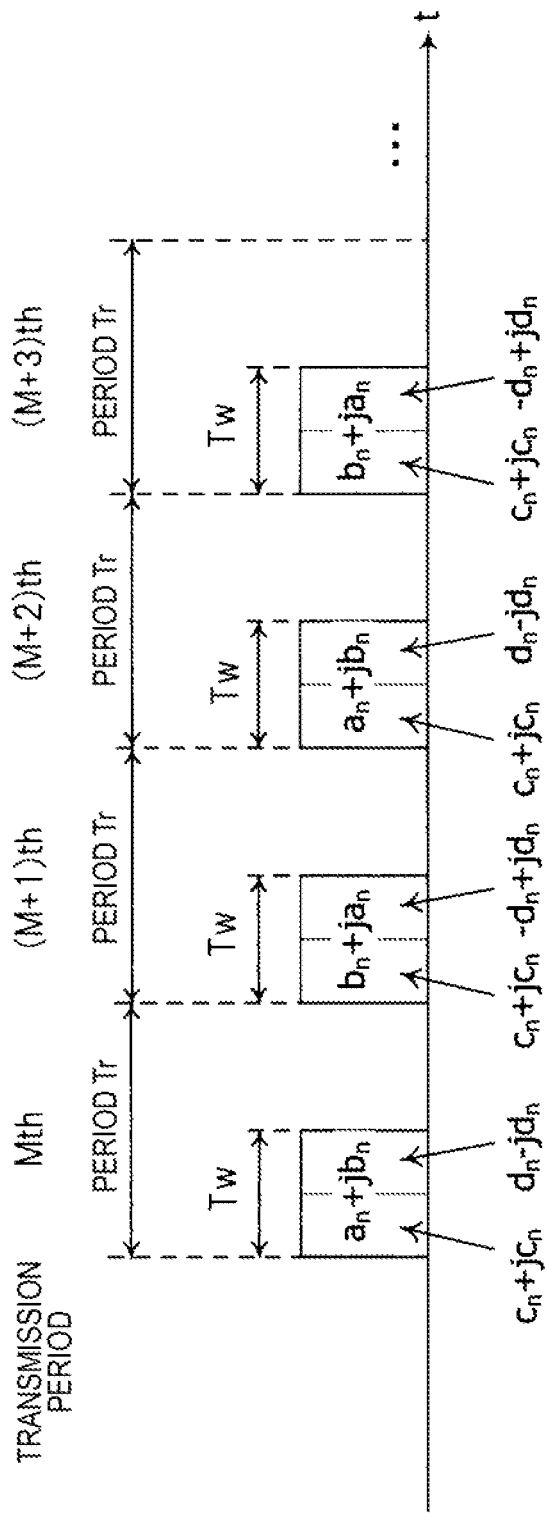
FIG. 8 is a view showing in detail transmission codes used in the transmission periods $T_r$ in the radar device of the second embodiment.

FIG. 8 is a view showing in detail transmission codes used in the transmission periods $T_r$ in the radar device $1a$ of the second embodiment.

In the following description of the second embodiment, the configurations and operations which are different from those of the first embodiment will be described, and the description of the configurations and operations which are same as those of the first embodiment will be omitted. In the second embodiment, the radar device $1a$ alternately switches over the transmission code to be allocated to the I axis in the transmission code to be IQ multiplexed, between the transmission code an and the transmission code $b_n$ in each transmission period $T_r$, and the transmission code to be allocated to the Q axis between the transmission code $b_n$ and the transmission code an. In the second embodiment, moreover, the Doppler frequency $f_d$ which is generated in accordance with the movement of the target is calculated, and an IQ multiplex interference component is removed in regard to an IQ correlation value which exceeds the calculated Doppler frequency $f_d$.

As shown in FIG. 5, the radar device $1a$ includes the reference oscillator $L_0$, a radar transmitter $2a$ to which the transmission antenna $ANT_0$ is connected, and a radar receiver $3a$ to which the reception antenna $ANT_1$ is connected. The radar device $1a$ transmits a predetermined intermittent radio frequency transmission signal which is generated by the radar transmitter $2a$, from the transmission antenna $ANT_0$, and receives the signal of the reflected wave which is reflected from the target, through the radar receiver $3a$. The radar device 1 performs signal processing on the reception signal which is received through the radar receiver $3a$, to detect the presence or absence of a target.

The radar transmitter $2a$ will be described. The radar transmitter $2a$ includes a transmission signal generator $4a$, and the RF transmitter 11. The transmission signal generator $4a$ includes a first code generator $5a$, a second code generator $6a$, a first switch SW1, a second switch SW2, a transmission code controller CT1, a first modulator $7a$, a second modulator $8a$, the LPF 9, and the LPF 10. In FIG. 5, the transmission signal generator $4a$ is configured so as to include the LPF 9 and the LPF 10. Alternatively, the LPF 9 and the LPF 10 may be configured in the radar transmitter $2a$ independently from the transmission signal generator $4a$. The configuration and operation of the RF transmitter 11 are similar to those of the first embodiment, and therefore the description of the configuration and the operation will be omitted.

Based on the reference signal generated by the reference oscillator $L_0$, the transmission signal generator $4a$ generates a signal which is obtained by multiplying the reference signal a predetermined number of times. The sections of the transmission signal generator $4a$ operate based on the generated signal. The transmission signal generator $4a$ modulates pulse compression codes of complementary code sequences $a_n$, $b_n$ each having a code length of L to periodically generate a base-band transmission signal. Here, n=1, . . . , L, and the parameter L indicates the code length of the complementary code sequences $a_n$, $b_n$.

It is assumed that the transmission signal generated by the transmission signal generator $4a$ is not a continuous signal. As shown in FIG. 6(a), in transmission zones $T_w$ of M-th to (M+3)-th transmission periods $T_r$, for example, an $N_0$ number of samples exist per pulse code with respect of the complementary code sequences $a_n$, $b_n$ having a code length of L. Therefore, an $N_r (=N_0 \times L)$ number of samples are contained in the transmission zone $T_w$. It is assumed that, in the non-transmission zone ($T_r - T_w$) of the M-th to (M+3)-th transmission periods $T_r$, an $N_0$ number of samples exist as the base-band transmission signal.

Hereinafter, the configurations of the sections of the transmission signal generator $4a$ will be described.

The first code generator $5a$ generates a transmission code for pulse compression of the complementary code sequence $a_n$ which is a pair of complementary code sequences having the code length of L. The first code generator $5a$ outputs the generated transmission code an to the first switch SW1 and the second switch SW2.

The second code generator $6a$ generates a transmission code for pulse compression of the complementary code sequence $b_n$ which is a pair of complementary code sequences having the code length of L. The second code generator $6a$ outputs the generated transmission code $b_n$ to the first switch SW1 and the second switch SW2.

The first switch SW1 receives the transmission code an and transmission code $b_n$ which are output from the first code generator $5a$ and the second code generator $6a$, respectively.

Based on a code switch controlling signal output from the transmission code controller CT1, the first switch SW1 selectively switches over one of the input transmission code an and transmission code bn, and outputs the switched transmission code to the first modulator 7a.

The second switch SW2 receives the transmission code an and transmission code $b_n$ which are output from the first code generator 5a and the second code generator 6a, respectively. Based on the code switch controlling signal output from the transmission code controller CT1, the second switch SW2 selectively switches over one of the input transmission code an and the transmission code bn, and outputs the switched transmission code to the second modulator 8a.

The transmission code controller CT1 controls the first switch SW1 and the second switch SW2 so that the transmission code an and transmission code $b_n$ which are input respectively to the first switch SW1 and the second switch SW2 are selectively switched over in each transmission period $T_r$. Namely, the transmission code controller CT1 outputs the code switch controlling signal instructing that the transmission codes are selectively switched over, to the first switch SW1 and the second switch SW2 in each transmission period $T_r$.

The operation of the transmission code controller CT1 will be specifically described with reference to FIG. 6(a).

In the M-th transmission period $T_r$, the transmission code controller CT1 controls the first switch SW1 so as to output the transmission code an to the first modulator 7a. In the M-th transmission period $T_r$, namely, the transmission code controller CT1 outputs the code switch controlling signal instructing that the transmission code is switched to the transmission code an, to the first switch SW1.

In the M-th transmission period $T_r$, moreover, the transmission code controller CT1 controls the second switch SW2 so as to output the transmission code $b_n$ to the second modulator 8a. In the M-th transmission period $T_r$, namely, the transmission code controller CT1 outputs the code switch controlling signal instructing that the transmission code is switched to the transmission code bn, to the second switch SW2.

In the (M+1)-th transmission period $T_r$, the transmission code controller CT1 controls the first switch SW1 so as to output the transmission code $b_n$ to the first modulator 7a. In the (M+1)-th transmission period $T_r$, namely, the transmission code controller CT1 outputs the code switch controlling signal instructing that the transmission code is switched to the transmission code bn, to the first switch SW1.

In the (M+1)-th transmission period $T_r$, moreover, the transmission code controller CT1 controls the second switch SW2 so as to output the transmission code an to the second modulator 8a. In the (M+1)-th transmission period $T_r$, namely, the transmission code controller CT1 outputs the code switch controlling signal instructing that the transmission code is switched to the transmission code an, to the second switch SW2.

In the (M+2)-th transmission period $T_r$, the transmission code controller CT1 controls the first switch SW1 so as to output the transmission code an to the first modulator 7a. In the (M+2)-th transmission period $T_r$, namely, the transmission code controller CT1 outputs the code switch controlling signal instructing that the transmission code is switched to the transmission code an, to the first switch SW1.

In the (M+2)-th transmission period $T_r$, moreover, the transmission code controller CT1 controls the second switch SW2 so as to output the transmission code $b_n$ to the second modulator 8a. In the (M+2)-th transmission period $T_r$, namely, the transmission code controller CT1 outputs the code switch controlling signal instructing that the transmission code is switched to the transmission code bn, to the second switch SW2.

In the (M+3)-th transmission period $T_r$, the transmission code controller CT1 controls the first switch SW1 so as to output the transmission code $b_n$ to the first modulator 7a. In the (M+3)-th transmission period $T_r$, namely, the transmission code controller CT1 outputs the code switch controlling signal instructing that the transmission code is switched to the transmission code bn, to the first switch SW1.

In the (M+3)-th transmission period $T_r$, moreover, the transmission code controller CT1 controls the second switch SW2 so as to output the transmission code an to the second modulator 8a. In the (M+3)-th transmission period $T_r$, namely, the transmission code controller CT1 outputs the code switch controlling signal instructing that the transmission code is switched to the transmission code an, to the second switch SW2.

In the (M+4)-th and subsequent transmission periods, the M-th and (M+1)-th or two in total transmission periods shown in FIG. 6(a) are set as a unit, transmission codes corresponding to the transmission periods in each unit are similarly generated, and repeatedly output to the first modulator 7a and the second modulator 8a.

The first modulator 7a receives the transmission code an or transmission code b output from the first switch SW1. The first modulator 7a performs pulse modulation (amplitude modulation, ASK) or phase modulation (PSK) on the input transmission code an or transmission code $b_n$ to generate a base-band transmission signal I(k). The first modulator 7a outputs a transmission signal I(k) which is equal to or lower than a preset limit band in the generated transmission signal I(k), to the RF transmitter 11 through the LPF 9.

The second modulator 8a receives the transmission code $b_n$ or transmission code an output from the second switch SW2. The second modulator 8a performs pulse modulation (amplitude modulation, ASK) or phase modulation (PSK) on the input transmission code $b_n$ or transmission code an to generate a base-band transmission signal Q(k). The second modulator 8a outputs a transmission signal Q(k) which is equal to or lower than a preset limit band in the generated transmission signal Q(k), to the RF transmitter 11 through the LPF 10.

The operations of the RF transmitter 11 and the transmission antenna $ANT_0$ are substantially similar to those in the first embodiment, and therefore the description of the operation s will be omitted. In the second embodiment, in the constellation diagram of the radio frequency transmission signal which is IQ multiplexed by the RF transmitter 11, however, the transmission codes which are supplied to the first modulator 7a and the second modulator 8a by the transmission code controller CT1 are different from each other. As shown in FIGS. 7(a) and 7(b), therefore, the constellation diagram of the radio frequency transmission signal which is IQ multiplexed by the RF transmitter 11 is different for each transmission period $T_r$.

Specifically, the constellation diagram shown in FIG. 7(a) is a constellation diagram of a radio frequency transmission signal which is IQ multiplexed in the M-th and (M+2)-th transmission periods $T_r$, while the transmission code an is allocated to the I axis, and the transmission code $b_n$ is allocated to the Q axis. Therefore, the radio frequency transmission signal s(t) shown in Exp. (6) above is a signal which is generated by IQ multiplexing the transmission codes $a_n$, $b_n$ so that one of signal points (A, A), (A, −A), (−A, A), and (−A, −A) shown in FIG. 7(a) is selected.

Furthermore, the constellation diagram shown in FIG. 7(b) is a constellation diagram of a radio frequency transmission signal which is IQ multiplexed in the (M+1)-th and (M+3)-th transmission periods $T_r$ while the transmission code $b_n$ is allocated to the I axis, and the transmission code an is allocated to the Q axis. Therefore, the radio frequency transmission signal s(t) shown in Exp. (6) above is a signal which is generated by IQ multiplexing the transmission codes $a_n$, $b_n$ so that one of signal points (A, A), (A, −A), (−A, A), and (−A, −A) shown in FIG. 7(b) is selected.

Next, the radar receiver 3a will be described.

The radar receiver 3a includes the reception antenna $ANT_1$, the RF receiver 17, and a signal processor 21a. The RF receiver 17 includes the amplifier 18, the frequency converter 19, and the quadrature detector 20. The signal processor 21a includes the A/D converters 22, 23, first and second reference signal generators 24a, 25a, first and second correlation value calculators 26a, 27a, an adder 28a, a reception signal selector 29a, the IQ multiplex interference component extractor 30, the subtracter 31, the averaging processor 32, the incoming distance estimator 33, and a Doppler frequency estimator 34. The radar receiver 3a periodically calculates the two-time transmission period $T_r$ (2 $T_r$) as a signal processing zone in the signal processor 21a.

The operations of the reception antenna $ANT_1$, the RF receiver 17, the A/D converter 22, and the A/D converter 23 are similar to those in the first embodiment, and therefore the description of the operations will be omitted. As shown in FIG. 6(b), the reception antenna $ANT_1$ receives the above-described reception signal in zones corresponding to the transmission periods $T_r$. Therefore, the zones $T_r$ where the reception signal is received are set as measurement zones in the radar device 1a.

As shown in FIG. 6(c), the discrete time of k=1 shows the starting timing of the transmission zone $T_w$ in the transmission period $T_r$ of the radio frequency transmission signal s(t) which is generated by IQ multiplex while alternately switching over the transmission code an and the transmission code $b_n$ in each transmission period $T_r$. The discrete time of k=$N_r$ shows the ending timing of the transmission zone $T_w$ in the transmission period $T_r$ of the radio frequency transmission signal s(t) which is generated by IQ multiplex while alternately switching over the transmission code an and the transmission code $b_n$ in each transmission period $T_r$. Moreover, The discrete time of k=($N_r+N_u$) shows the timing immediately before the ending of the transmission period $T_r$ of the radio frequency transmission signal s(t) which is generated by IQ multiplex while alternately switching over the transmission code an and the transmission code $b_n$ in each predetermined transmission period $T_r$. In FIG. 6(c), in order to conveniently illustrate the range of the discrete time k, the range of the discrete time k is shown only in the M-th transmission period.

In synchronization with the operation of the transmission signal generator 4a, based on the reference signal generated by the reference oscillator $L_O$ in a similar manner as the transmission signal generator 4a, the first reference signal generator 24a generates a timing clock which is obtained by multiplying the reference signal a predetermined number of times. Based on the generated timing clock, the first reference signal generator 24a generates a first reference transmission signal I(k) of the same base band as the transmission signal I(k) generated by the first modulator 7a.

In the M-th and (M+2)-th transmission periods $T_r$ shown in FIG. 6(a), as described above, the transmission code controller CT1 outputs the transmission code an generated by the first code generator 5a to the first modulator 7a through the first switch SW1.

In the (M+1)-th and (M+3)-th transmission periods $T_r$ shown in FIG. 6(a), moreover, the transmission code controller CT1 outputs the transmission code $b_n$ generated by the second code generator 6a to the first modulator 7a through the first switch SW1.

In the M-th and (M+2)-th transmission periods $T_r$ shown in FIG. 6(a), therefore, the first reference signal generator 24a generates the first reference transmission signal I(k) which is identical with the transmission signal I(k) generated based on the transmission code an supplied to the first modulator 7a.

In the (M+1)-th and (M+3)-th transmission periods $T_r$ shown in FIG. 6(a), moreover, the first reference signal generator 24a generates the first reference transmission signal I(k) which is identical with the transmission signal I(k) generated based on the transmission code $b_n$ supplied to the first modulator 7a.

The first reference signal generator 24a outputs the first reference transmission signals I(k) generated in the transmission periods $T_r$, to the first correlation value calculator 26a.

In synchronization with the operation of the transmission signal generator 4a, based on the reference signal generated by the reference oscillator $L_O$ in a similar manner as the transmission signal generator 4a, the second reference signal generator 25a generates a timing clock which is obtained by multiplying the reference signal a predetermined number of times. Based on the generated timing clock, the second reference signal generator 25a periodically generates the second reference transmission signal jQ(k) which is obtained by applying Q-axis phase rotation in the IQ multiplex to the transmission signal Q(k) of the same base band as the transmission signal Q(k) generated by the second modulator 8a.

In the M-th and (M+2)-th transmission periods $T_r$ shown in FIG. 6(a), as described above, the transmission code controller CT1 outputs the transmission code $b_n$ generated by the second code generator 6a to the second modulator 8a through the second switch SW2.

In the (M+1)-th and (M+3)-th transmission periods $T_r$ shown in FIG. 6(a), moreover, the transmission code controller CT1 outputs the transmission code an generated by the first code generator 5a to the second modulator 8a through the first switch SW1.

In the M-th and (M+2)-th transmission periods $T_r$ shown in FIG. 6(a), therefore, the second reference signal generator 25a generates the second reference transmission signal jQ(k) which is obtained by applying Q-axis phase rotation in the IQ multiplex to the transmission signal Q(k) that is identical with the transmission signal Q(k) generated based on the transmission code $b_n$ supplied to the second modulator 8a.

In the (M+1)-th and (M+3)-th transmission periods $T_r$ shown in FIG. 6(a), moreover, the second reference signal generator 25a generates the second reference transmission signal jQ(k) which is obtained by applying Q-axis phase rotation in the IQ multiplex to the transmission signal Q(k) that is identical with the transmission signal Q(k) generated based on the transmission code an supplied to the second modulator 8a.

The second reference signal generator 25a outputs the second reference transmission signals jQ(k) generated in the transmission periods $T_r$, to the second correlation value calculator 27a.

The first correlation value calculator 26a receives the complex signal x(k) of the digital data output from the A/D converter 22, and the first reference transmission signal I(k) output from the first reference signal generator 24a. The first correlation value calculator 26a calculates a first correlation value $AC_1(k)$ of the input complex signal x(k) and the first reference transmission signal I(k). The symbol of * (asterisk) represents a complex conjugate operator.

Specifically, in the case of the discrete time k=1 to $(N_r+N_u)$, the first correlation value calculator 26a calculates the first correlation value $AC_1(k)$ in accordance with Exp. (8) above. The first correlation value calculator 26a outputs the first correlation value $AC_1(k)$ which is calculated in accordance with Exp. (8), to the adder 28a.

The second correlation value calculator 27a receives the complex signal x(k) of the digital data output from the A/D converter 23, and the second reference transmission signal jQ(k) output from the second reference signal generator 25a. The second correlation value calculator 27a calculates a second correlation value $AC_2(k)$ of the input complex signal x(k) and the second reference transmission signal jQ(k). The symbol of * (asterisk) represents a complex conjugate operator.

Specifically, in the case of the discrete time k=1 to $(N_r+N_u)$, the second correlation value calculator 27a calculates the second correlation value $AC_2(k)$ in accordance with Exp. (9) above. The second correlation value calculator 27a outputs the second correlation value $AC_2(k)$ which is calculated in accordance with Exp. (9), to the adder 28a.

As described above, each of the calculations of the first correlation value calculator 26a and the second correlation value calculator 27a is performed on the discrete time k=1 to $(N_r+N_u)$. Depending on the existing range of the target which is the measurement object of the radar device, the measurement range (the range of k) may be further limited.

As a result, the radar device 1a can reduce the calculation amounts of the first correlation value calculator 26a and the second correlation value calculator 27a. Namely, the radar device 1a can reduce the power consumption due to the reduction of the calculation amounts by the signal processor 21a.

The adder 28a receives the first correlation value $AC_1(k)$ output from the first correlation value calculator 26a, and the second correlation value $AC_2(k)$ output from the second correlation value calculator 27a. The adder 28a adds together the input first correlation value $AC_1(k)$ and second correlation value $AC_2(k)$ in a state where the discrete times k are coincident with each other, as shown in Exp. (10) above to calculate the IQ correlation value AC(k). The adder 28a outputs the calculated IQ correlation value AC(k) to the reception signal selector 29a and the subtracter 31.

Moreover, the adder 28a outputs first-half correlation values $AC_{sub1}(k)$ of the IQ correlation value AC(k) in the first-half portions of the transmission zones $T_w$ in the transmission periods $T_r$, to the Doppler frequency estimator 34. Furthermore, the adder 28a outputs second-half correlation values $AC_{sub2}(k+(N_r/2))$ of the IQ correlation value AC(k) in the second-half portions of the transmission zones $T_w$ in the transmission periods $T_r$, to the Doppler frequency estimator 34.

The Doppler frequency estimator 34 receives the first-half correlation values $AC_{sub1}(k)$ and second-half correlation values $AC_{sub2}(k+(N_r/2))$ output from the adder 28a. The Doppler frequency estimator 34 calculates the Doppler frequency $f_d$ in the IQ correlation value AC(k) based on the input first-half correlation values $AC_{sub1}(k)$ and second-half correlation values $AC_{sub2}(k+(N_r/2))$.

Hereinafter, the calculation in the Doppler frequency estimator 34 will be described with reference to FIG. 8. FIG. 8 is a view showing in detail the transmission codes used in the transmission periods $T_r$ in the radar device 1a of the second embodiment. As shown in FIG. 14, the complementary code sequences $a_n$, $b_n$ are obtained by coupling $c_n$, $d_n$ which are a pair of subcomplementary codes having a code length L/2, as indicated by Exp. (14). Here, $c_n$, $d_n$ which are a pair of sub-complementary codes can be expressed as Exp. (15)

[Exp. 14]

$$a_n = [a_1, a_2, \ldots, a_{L/2}, a_{(L/2)+1}, \ldots, a_L] \quad (14)$$
$$= [c_1, c_2, \ldots, c_{L/2}, d_1, d_2, \ldots, d_{L/2}]$$
$$b_n = [b_1, b_2, \ldots, b_{L/2}, b_{(L/2)+1}, \ldots, b_L]$$
$$= [c_1, c_2, \ldots, c_{L/2}, -d_1, -d_2, \ldots, -d_{L/2}]$$

[Exp. 15]

$$c_n = [c_1, c_2, \ldots, c_{L/2}] \quad (15)$$
$$d_n = [d_1, d_2, \ldots, d_{L/2}]$$

[In Case of M-th and (M+2)-th Transmission Periods $T_r$]

As shown in FIG. 8, in transmission zones $T_w$ of the M-th and (M+2)-th transmission periods $T_r$, in the first-half portions of the transmission zones $T_w$, the transmission codes which are IQ multiplexed are indicated by Exp. (16). Similarly, in the second-half portions of the transmission zones $T_w$, the transmission codes which are IQ multiplexed are indicated by Exp. (17).

[Exp. 16]

$$A(a_n + jb_n) = A(c_n + jc_n) \quad (16)$$
$$= \sqrt{2}\, A\exp(j\pi/4)c_n,$$
$$n = 1, \ldots, L/2$$

[Exp. 17]

$$A(a_n + jb_n) = A(d_n - jd_n) \quad (17)$$
$$= \sqrt{2}\, A\exp(-j\pi/4)c_n,$$
$$n = \frac{L}{2} + 1, \ldots, L$$

Among the IQ correlation values AC(k) which are calculated based on the transmission codes of Exp. (16) and Exp. (17), the second-half correlation values $AC_{sub2}(k+(N_r/2))$ in the second-half portions of the transmission zones $T_w$ are phase-shifted by −90 degrees with respect to the first-half correlation values $AC_{sub1}(k)$ in the first-half portions of the transmission zones $T_w$. Therefore, the Doppler frequency estimator 34 rotates the phase of the second-half correlation value $AC_{sub2}(k+(N_r/2))$ by 90 degrees in order to align the phase with that of the first-half correlation value $AC_{sub1}(k)$. Namely, in order to apply the phase rotation of 90 degrees to the second-half correlation value $AC_{sub2}(k+(N_r/2))$, the Doppler frequency estimator 34 multiplies the second-half correlation value $AC_{sub2}(k+(N_r/2))$ with the imaginary coefficient j.

Therefore, the Doppler frequency estimator 34 can eliminate the fixed phase difference of 90 degrees between the phase component of the first-half correlation value and that of the second-half correlation value. Thereafter, based on the phase rotation amount which is generated between the phase component of the first-half correlation value and that of the second-half correlation value in accordance with the movement of the target, the Doppler frequency estimator 34 calculates the Doppler frequency $f_d$ in accordance with Exp. (18). The Doppler frequency estimator 34 outputs the calculated Doppler frequency $f_d$ to the reception signal selector 29a. As described above, $N_r=N_0 \times L$. Here, $\angle[x]$ indicates the phase component of the complex number x.

[Exp. 18]

$$f_d(k) = \frac{1}{2\pi(T_w/2)} \angle\left[jAC_{sub2}\left(k + \frac{N_r}{2}\right)\right][AC_{sub1}(k)^*] = \quad (18)$$

$$\frac{1}{2\pi(T_w/2)} \angle\left[j\sum_{m=1}^{N_r/2} x\left(k + \frac{N_r}{2} + m - 1\right)\{I(m) = jQ(m)\}\right]$$

$$\left[\sum_{m=1}^{N_r/2} x(k + m - 1)\{I(m) + jQ(m)\}^*\right] =$$

$$\frac{1}{2\pi(T_w/2)} \angle\left[j\sum_{m=(N_r/2)+1}^{N_r} x(k + m - 1)\{1(m) + jQ(m)\}^*\right]$$

$$\left[\sum_{m=1}^{N_r/2} x(k + m - 1)\{I(m) + jQ(m)\}^*\right]$$

[In Case of (M+1)-th and (M+3)-th Transmission Periods $T_r$.]

As shown in FIG. 8, in transmission zones $T_w$ of the (M+1)-th and (M+3)-th transmission periods $T_r$, in the first-half portions of the transmission zones $T_w$, the transmission codes which are IQ multiplexed are indicated by Exp. (19). Similarly, in the second-half portions of the transmission zones $T_w$, the transmission codes which are IQ multiplexed are indicated by Exp. (20).

[Exp. 19]

$$A(b_n + ja_n) = A(c_n + jc_n) \quad (19)$$
$$= \sqrt{2}\,A\exp(j\pi/4)c_n,$$
$$n = 1, \ldots, L/2$$

[Exp. 20]

$$A(b_n + ja_n) = A(-d_n + jd_n) \quad (20)$$
$$= \sqrt{2}\,A\exp(j3\pi/4)d_n,$$
$$n = \frac{L}{2} + 1, \ldots, L$$

Among the IQ correlation values AC(k) which are calculated based on the transmission codes of Exp. (19) and Exp. (20), the second-half correlation values $AC_{sub2}(k+(N_r/2))$ in the second-half portions of the transmission zones $T_w$ are phase-shifted by 90 degrees with respect to the first-half correlation values $AC_{sub1}(k)$ in the first-half portions of the transmission zones $T_w$. Therefore, the Doppler frequency estimator 34 rotates the phase of the second-half correlation value $AC_{sub2}(k+(N_r/2))$ by −90 degrees in order to align the phase with that of the first-half correlation value $AC_{sub1}(k)$. Namely, in order to apply the phase rotation of −90 degrees to the second-half correlation value $AC_{sub2}(k+(N_r/2))$, the Doppler frequency estimator 34 multiplies the second-half correlation value $AC_{sub2}(k+(N_r/2))$ with the imaginary coefficient −j.

Therefore, the Doppler frequency estimator 34 can eliminate the fixed phase difference of −90 degrees between the phase component of the first-half correlation value and that of the second-half correlation value. Thereafter, based on the phase rotation amount which is generated between the phase component of the first-half correlation value and that of the second-half correlation value in accordance with the movement of the target, the Doppler frequency estimator 34 calculates the Doppler frequency $f_d$ in accordance with Exp. (21). The Doppler frequency estimator 34 outputs the calculated Doppler frequency $f_d$ to the reception signal selector 29a. As described above, $N_r=N_0 \times L$.

[Exp. 21]

$$f_d(k) = \frac{1}{2\pi(T_w/2)} \angle\left[-jAC_{sub2}\left(k + \frac{N_r}{2}\right)\right][AC_{sub1}(k)^*] = \quad (21)$$

$$\frac{1}{2\pi(T_w/2)} \angle\left[-j\sum_{m=1}^{N_r/2} x\left(k + \frac{N_r}{2} + m - 1\right)\{I(m) + jQ(m)\}^*\right]$$

$$\left[\sum_{m=1}^{N_r/2} x*(k + m - 1)\{I(m) + jQ(m)\}^*\right] =$$

$$\frac{1}{2\pi(T_w/2)} \angle\left[-j\sum_{m=(N_r/2)+1}^{N_r} x(k + m - 1)\{I(m) + jQ(m)\}\right]$$

$$\left[\sum_{m=1}^{N_r/2} x(k + m - 1)\{I(m) + jQ(m)\}^*\right]$$

The reception signal selector 29a receives the IQ correlation value AC(k) output from the adder 28a, and the Doppler frequency $f_d(k)$ output from the Doppler frequency estimator 34. The reception signal selector 29a selects an IQ correlation value $AC(k_{pq})$ which exceeds the preset predetermined threshold B, and in which the Doppler frequency $f_d(k)$ is not lower than a preset predetermined threshold D, from the input IQ correlation value AC(k).

Namely, the reception signal selector 29a extracts discrete times $k_{pq}$ satisfying Exp. (22), and outputs IQ correlation values ($k_{p1}$), $AC(k_{p2})$, . . . , $AC(k_{pv})$ in which IQ correlation values $AC(k_{pq})$ corresponding to the extracted discrete times $k_{pq}$ are arranged in descending order, to the IQ multiplex interference component extractor 30. The parameters p1, p2, . . . , pv are natural numbers in the sample numbers 1 to ($N_r+N_u$), and the ordinal numbers of the discrete times $k_{pq}$ corresponding to IQ correlation values $AC(k_{pq})$ satisfying Exp. (11). It is assumed that the parameter q is one of q=1, 2, . . . , v. The parameter v is a natural number, and indicates the number of discrete times $k_{pq}$ satisfying Exp. (11).

[Exp. 22]

$$|AC(k_{pq})| \geq B \text{ and } f_d(k_{pq}) \geq D \quad (22)$$

Here, the predetermined threshold D indicates a value at which, in the signal processing, the signal processor 21a cannot neglect the influence of the Doppler frequency $f_d$ that is generated in accordance with the movement. The meaning of the predetermined threshold D is applicable similarly in the following embodiments.

The averaging processor 32 receives the fourth correlation value AC'(k) which is derived by the subtracter 31. The averaging processor 32 performs an averaging process due to addition of the fourth correlation value AC(k) in the periods of k=1, . . . , ($N_r+N_u$), on the radar transmission signal in which the complementary codes $a_n$, $b_n$ in the radar transmission period ($2T_r$) are alternately IQ multiplexed to the I axis and the Q axis. Here, the addition is performed for each of results of correlation calculations at the times k. The averaging processor 32 outputs the average value of the averaged fourth correlation value AC'(k) to the incoming distance estimator 33.

As a result, with respect to a target which is less affected by the Doppler variation due to movement in targets which are measurement objects, when the complementary codes $a_n$, $b_n$ in the radar transmission period ($2T_r$) which are alternately IQ multiplexed to the I axis and the Q axis are used, the side lobe can be made ideally zero by using the property of complementary codes.

Moreover, a process may be added in which noise components are suppressed by further performing an averaging process for a plurality of radar transmission times, while setting results of the addition processes of correlation calculation values for $2T_r$ which are these two radar transmission periods ($T_r$), as one unit. This enables the radar device 1 to suppress noise components in the periphery of the radar device 1, and improve the measurement performance related to estimation of the incoming angle and distance of the target.

The operations of the IQ multiplex interference component extractor 30, the subtracter 31, and the incoming distance estimator 33 are similar to those in the first embodiment, and therefore the description of the operations will be omitted.

According to the radar device 1a of the second embodiment, even when a target moves, the low range side lobe characteristics of a signal of a reflected wave from the target is maintained, and the range side lobe level is effectively suppressed, whereby impairment of the separation performance in detection of a plurality of targets can be suppressed.

According to the radar device 1a of the second embodiment, the transmission code an and the transmission code $b_n$ are IQ multiplexed in transmission, and therefore, in order to obtain a result of one measurement, a time period corresponding to two transmission periods in total is required. According to the radar device 1a, similarly with the radar device 1 of the first embodiment, therefore, the number of measurements within a predetermined time period can be increased, and namely the measurement performance can be improved.

Moreover, the radar device 1a selects an IQ correlation value which exceeds the predetermined threshold B, and in which the Doppler frequency $f_d$ exceeds the preset predetermined threshold D, and removes an IQ multiplex interference component in the selected IQ correlation value. Therefore, the radar device 1a does not perform the removal of an IQ multiplex interference component on a signal of a reflected wave in which, even when affected by the Doppler frequency $f_d$ that is generated in accordance with the movement of the target, the low range side lobe characteristics are not impaired. In other words, the radar device 1a performs the removal of an IQ multiplex interference component, only on a signal of a reflected wave in which, when affected by the Doppler frequency $f_d$ that is generated in accordance with the movement of the target, the low range side lobe characteristics are impaired. According to the configuration, in the radar device 1a, the amount of calculation for removing an IQ multiplex interference component can be remarkably reduced as compared to the radar device 1 of the first embodiment.

Modifications 1 of Embodiments

Figure 9:
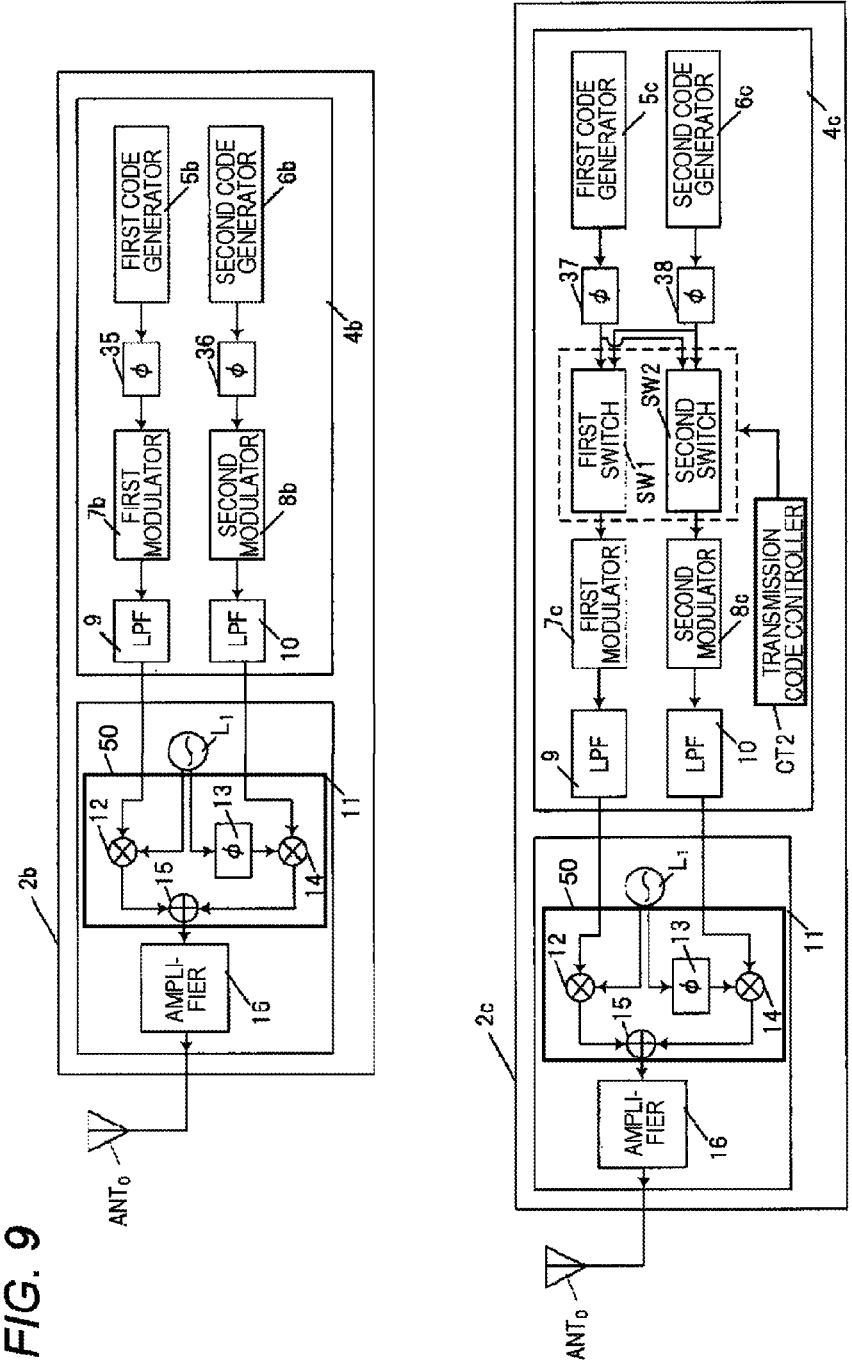
FIG. 9 shows block diagrams showing the internal configurations of radar transmitters in Modifications 1 of the embodiments, (a) is a diagram showing the internal configuration of a radar transmitter in Modification 1 of the first embodiment, and (b) is a diagram showing the internal configuration of a radar transmitter in Modification 1 of the second embodiment.

Modifications 1 of the above-described embodiments will be described with reference to FIGS. 9 and 10. FIG. 9 shows block diagrams showing the internal configurations of radar transmitters in Modifications 1 of the embodiments, (a) of the figure is a diagram showing the internal configuration of a radar transmitter 2b in Modification 1 of the first embodiment, and (b) of the figure is a diagram showing the internal configuration of a radar transmitter 2c in Modification 1 of the second embodiment.

Figure 10:
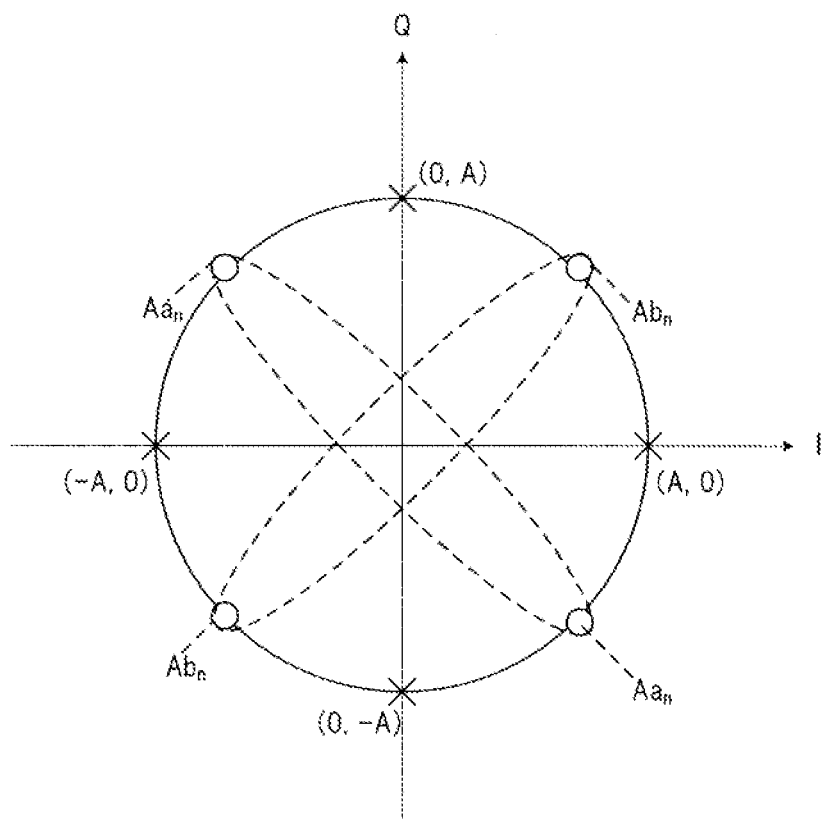
FIG. 10 is a constellation diagram of a radio frequency transmission signal which is IQ multiplexed while the complementary code an is allocated to the I axis and phase-shifted by −45 degrees, and the complementary code $b_n$ is allocated to the Q axis and phase-shifted by −45 degrees

FIG. 10 is a constellation diagram of a radio frequency transmission signal which is IQ multiplexed while the complementary code an is allocated to the I axis and phase-shifted by −45 degrees, and the complementary code $b_n$ is allocated to the Q axis and phase-shifted by −45 degrees In FIG. 10, the reference oscillator $L_O$ shown in FIG. 1 is not shown, but, based on the reference signal generated by the reference oscillator $L_O$, the transmission signal generator 4b generates a signal which is obtained by multiplying the reference signal a predetermined number of times. The sections of the transmission signal generator 4b operate based on the generated signal.

Based on the reference signal generated by the reference oscillator $L_O$, also the RF transmitter 11 generates a signal which is obtained by multiplying the reference signal the predetermined number of times. The RF transmitter 11 operates based on the generated signal.

In the following description of Modifications 1 of the embodiments, only the contents which are different from those of the above-described first or second embodiment will be described, and the description of the same contents will be omitted. In the first embodiment or the second embodiment, in the IQ multiplex, the transmission code an or $b_n$ is allocated to the I axis, the transmission code $b_n$ or an is directly allocated to the Q axis, and the phase rotation in the allocation is not considered. In Modifications 1 of the embodiments, as shown in FIG. 10, after respective applications of phase rotation of a predetermined angle θ, the transmission code an and the transmission code $b_n$ are IQ multiplexed. In FIG. 10, an example where the angle θ=−45 degrees is shown. The angle is not limited to this. Even when θ=45 degrees, similar effects can be attained. Hereinafter, description will be made in the sequence of the radar transmitter 2b in Modification 1 of the first embodiment, and the radar transmitter 2c in Modification 1 of the second embodiment.

As shown in FIG. 9(a), the radar transmitter 2b in Modification 1 of the first embodiment includes a transmission signal generator 4b, and the RF transmitter 11. The transmission signal generator 4b includes a first code generator 5b, a second code generator 6b, a second phase shifter 35, a third phase shifter 36, a first modulator 7b, a second modulator 8b, the LPF 9, and the LPF 10.

In FIG. 9(a), the transmission signal generator 4b is configured so as to include the LPF 9 and the LPF 10. Alternatively, the LPF 9 and the LPF 10 may be configured in the radar transmitter 2b independently from the transmission signal generator 4b. The configuration and operation of the RF transmitter 11 are similar to those of the first embodiment, and therefore the description of the configuration and the operation will be omitted. Moreover, the configuration and operation of the radar receiver in Modification 1 of the first embodiment are similar to those of the radar receiver 3 in the first embodiment, and therefore the description of the configuration and the operation will be omitted.

The transmission code an generated by the first code generator 5b is supplied to the second phase shifter 35. The transmission code $b_n$ generated by the second code generator 6b is supplied to the third phase shifter 36.

The second phase shifter 35 applies phase rotation corresponding to the predetermined angle θ to the input transmission code an. As described above, for example, the second phase shifter 35 applies phase rotation of −45 degrees to the transmission code an output from the first code generator 5b. The second phase shifter 35 supplies the phase-rotated transmission code an to the first modulator 7b.

Similarly, the third phase shifter 36 applies phase rotation corresponding to the predetermined angle θ to the input transmission code bn. As described above, for example, the third phase shifter 36 applies phase rotation of −45 degrees to the transmission code $b_n$ output from the second code generator 6b. The third phase shifter 36 supplies the phase-rotated transmission code $b_n$ to the second modulator 8b.

As shown in FIG. 9(b), the radar transmitter 2c in Modification 1 of the second embodiment includes a transmission signal generator 4c, and the RF transmitter 11. The transmission signal generator 4c includes a first code generator 5c, a second code generator 6c, a second phase shifter 37, a third phase shifter 38, the first switch SW1, the second switch SW2, a transmission code controller CT2, a first modulator 7c, a second modulator 8c, the LPF 9, and the LPF 10.

In FIG. 9(b), the transmission signal generator 4b is configured so as to include the LPF 9 and the LPF 10. Alternatively, the LPF 9 and the LPF 10 may be configured in the radar transmitter 2c independently from the transmission signal generator 4c. The configuration and operation of the RF transmitter 11 are similar to those of the second embodiment, and therefore the description of the configuration and the operation will be omitted. Moreover, the configuration and operation of the radar receiver in Modification 1 of the second embodiment are similar to those of the radar receiver 3a in the second embodiment, and therefore the description of the configuration and the operation will be omitted.

The transmission code an generated by the first code generator 5c is supplied to the second phase shifter 37. The transmission code b generated by the second code generator 6c is supplied to the third phase shifter 38.

The second phase shifter 37 applies phase rotation corresponding to the predetermined angle θ to the input transmission code an. As described above, for example, the second phase shifter 37 applies phase rotation of −45 degrees to the transmission code an output from the first code generator 5c. The second phase shifter 37 supplies the phase-rotated transmission code an to the first switch SW1 and the second switch SW2.

Similarly, the third phase shifter 38 applies phase rotation corresponding to the predetermined angle θ to the input transmission code bn. As described above, for example, the third phase shifter 38 applies phase rotation of −45 degrees to the transmission code b output from the second code generator 6c. The third phase shifter 38 supplies the phase-rotated transmission code b to the first switch SW1 and the second switch SW2.

The operations of the first switch SW1, the second switch SW2, the transmission code controller CT2, the first modulator 7c, and the second modulator 8c are similar to those in the second embodiment, and therefore the description of the operations will be omitted.

As described above, as compared to the radar device 1 of the first embodiment or the radar device 1a of the second embodiment, the radar devices of Modifications 1 of the embodiments generate the radio frequency transmission signal based on the signal point arrangement after IQ multiplex shown in FIG. 10. According to the radar devices of Modifications 1 of the embodiments, in addition to the effects of the above-described radar device 1 or 1a, therefore, an average transmission power can be reduced because, in the case where phase rotation of 45 degrees or −45 degrees is applied in the phase shifter, the signal points of the above-described radio frequency transmission signal s(t) in IQ multiplex are placed on the I axis and the Q axis.

Modifications 2 of Embodiments

Figure 11:
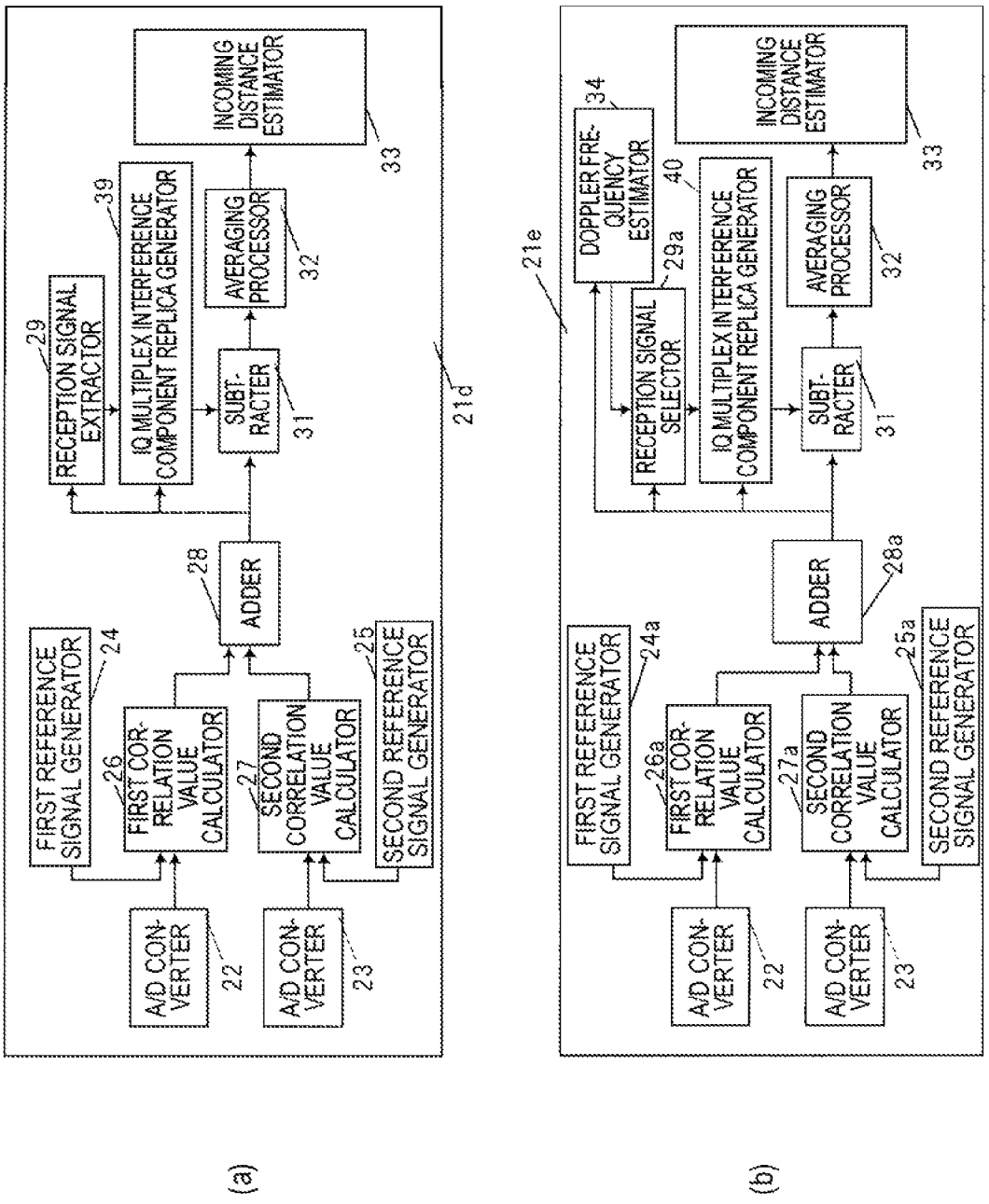
FIG. 11 shows block diagrams showing the internal configurations of signal processors of radar receivers in Modifications 2 of the embodiments, (a) is a diagram showing the internal configuration of a signal processor of a radar receiver in Modification 2 of the first embodiment, and (b) is a diagram showing the internal configuration of a signal processor of a radar receiver in Modification 2 of the second embodiment.

Modifications 2 of the above-described embodiments will be described with reference to FIG. 11. FIG. 11 shows block diagrams showing the internal configurations of signal processors of radar receivers in Modifications 2 of the embodiments, (a) of the figure is a diagram showing the internal configuration of a signal processor 21d of a radar receiver in Modification 2 of the first embodiment, and (b) of the figure is a diagram showing an internal configuration of a signal processor 21e of the radar receiver in Modification 2 of the second embodiment.

In the following description of Modifications 2 of the embodiments, only the contents which are different from those of the above-described first or second embodiment will be described, and the description of the same contents will be omitted. In the first embodiment or the second embodiment, based on the phase component $\theta(k_{pq})$ of the IQ correlation values $AC(k_{pq})$ output from the reception signal extractor 29 or the reception signal selector 29a, the IQ multiplex interference component extractor 30 calculates the component perpendicular to the phase component $\theta(k_{pq})$, as an IQ multiplex interference component.

In Modification 2 of the first embodiment in Modifications 2 of the embodiments, an IQ multiplex interference component generator 39 is disposed in place of the IQ multiplex interference component extractor 30. In Modification 2 of the second embodiment, furthermore, an IQ multiplex interference component generator 40 is disposed in place of the IQ multiplex interference component extractor 30. The IQ multiplex interference component generators 39, 40 accurately calculate a replica of the IQ multiplex interference component based on the phase component $\theta(k_{pq})$.

As shown in FIG. 11(a), the signal processor 21d in Modification 2 of the first embodiment includes the A/D converters 22, 23, the first and second reference transmission signal generators 24, 25, the first and second correlation value calculators 26, 27, the adder 28, the reception signal extractor 29, the IQ multiplex interference component replica generator 39, the subtracter 31, the averaging processor 32, and the incoming distance estimator 33.

Similarly with the signal processor 21 in the first embodiment, the signal processor 21d periodically calculates the transmission periods $T_r$ as signal processing zones in the signal processor 21. Moreover, the configurations and operations of the radar transmitter and the RF receiver of the radar receiver in Modification 2 of the first embodiment are similar to those of the radar transmitter 2 and the RF receiver 17 in the first embodiment, and therefore the description of the configurations and the operations will be omitted.

The operations of the A/D converters 22, 23, the first and second reference transmission signal generators 24, 25, the first and second correlation value calculators 26, 27, the adder 28, the reception signal extractor 29, the averaging processor 32, and the incoming distance estimator 33 are similar to those of the first embodiment, and therefore the description of the operations will be omitted.

The IQ multiplex interference component replica generator 39 receives the IQ correlation values $AC(k_{pq})$ output from the reception signal extractor 29. Based on the IQ correlation values $AC(k_{pq})$, the IQ multiplex interference component replica generator 39 calculates an IQ multiplex interference component replica U(k) in accordance with Exp. (23). The IQ multiplex interference component replica generator 39 outputs the calculated IQ multiplex interference component replica U(k) to the subtracter 31. Here, $k=k_{pq}-N_0L+1, k_{pq}, \ldots, k_{pq}+N_0L-1$. However, the case where k<1 or k>($N_r+N_u$) is not included in the range where the replica producing process is to be performed.

[Exp. 23]

$$U(k) = AC(k_{pq}) \sum_{m=1}^{N_r} \{I(k+m-1) + jQ(k+m-1)\}\{I(m) + jQ(m)\}^* \quad (23)$$

The subtracter 31 receives the IQ multiplex interference component replica U(k) output from the IQ multiplex interference component replica generator 39. As indicated in Exp. (24), the subtracter 31 removes (subtracts) the IQ multiplex interference component replica U(k) which is calculated based on Exp. (23), from the IQ correlation values AC(k) which are extracted by the reception signal extractor 29. The subtracter 31 derives the fourth correlation value AC(k) from which the IQ multiplex interference component is accurately removed, as a result of the removal. The subtracter 31 outputs the derived fourth correlation value AC(k) to the averaging processor 32.

[Exp. 24]

$$AC'(k) = AC(k) - U(k) \quad (24)$$

According to the configuration, the subtracter 31 can accurately remove the range side lobe component from the IQ correlation values AC(k) which are extracted by the reception signal extractor 29. Also when a signal of a reflected wave reflected from a moving target is received, therefore, the subtracter 31 can obtain the fourth correlation value AC'(k) in which the range side lobe level is effectively suppressed.

As shown in FIG. 11(b), the signal processor 21e of the radar receiver in Modification 2 of the second embodiment includes the A/D converters 22, 23, the first and second reference transmission signal generators 24a, 25a, the first and second correlation value calculators 26a, 27a, the adder 28a, the reception signal selector 29a, the IQ multiplex interference component replica generator 40, the subtracter 31, the averaging processor 32, the incoming distance estimator 33, and the Doppler frequency estimator 34.

Similarly with the signal processor 21 in the second embodiment, the signal processor 21e periodically calculates the two-time transmission period $T_r$ ($2T_r$) as a signal processing zone in the signal processor 21e. Moreover, the configurations and operations of the radar transmitter and the RF receiver of the radar receiver in Modification 2 of the second embodiment are similar to those of the radar transmitter 2a and the RF receiver 17 in the second embodiment, and therefore the description of the configurations and the operations will be omitted.

The operations of the A/D converters 22, 23, the first and second reference transmission signal generators 24a, 25a, the first and second correlation value calculators 26a, 27a, the adder 28a, the reception signal selector 29a, the Doppler frequency estimator 34, the averaging processor 32, and the incoming distance estimator 33 are similar to those of the second embodiment, and therefore the description of the operations will be omitted.

The IQ multiplex interference component replica generator 40 receives the IQ correlation values AC($k_{pq}$) output from the reception signal extractor 29a. Based on the phase component $\theta(k_{pq})$ of the calculated IQ correlation values AC($k_{pq}$), the IQ multiplex interference component replica generator 40 calculates the IQ multiplex interference component replica U(k) in accordance with above-described Exp. (22). The IQ multiplex interference component replica generator 40 outputs the calculated IQ multiplex interference component replica U(k) to the subtracter 31. Here, $k=k_{pq}-N_0L+1, k_{pq}, \ldots,$ $k_{pq}+N_0L-1$. However, the case where k<1 or k>($N_r+N_u$) is not included in the range where the replica producing process is to be performed.

The subtracter 31 receives the IQ multiplex interference component replica U(k) output from the IQ multiplex interference component replica generator 40. As indicated in above-described Exp. (23), the subtracter 31 removes (subtracts) the IQ multiplex interference component replica U(k) which is calculated by above-described Exp. (23), from the IQ correlation values AC(k) which are extracted by the reception signal extractor 29. The subtracter 31 derives the fourth correlation value AC(k) from which the IQ multiplex interference component is accurately removed, as a result of the removal. The subtracter 31 outputs the derived fourth correlation value AC(k) to the averaging processor 32.

According to the configuration, the subtracter 31 can accurately remove the range side lobe component from the IQ correlation values AC($k_{pq}$) which are selected by the reception signal selector 29a. Also when a signal of a reflected wave reflected from a moving target is received, the subtracter 31 can obtain the fourth correlation value AC($k_{pq}$) in which the range side lobe level is effectively suppressed.

As described above, as compared to the radar device 1 of the first embodiment or the radar device 1a of the second embodiment, the radar devices of Modifications 2 of the embodiments accurately generate the IQ multiplex interference component. According to the radar devices of Modifications 2 of the embodiments, in addition to the effects of the above-described radar device 1 or 1a, therefore, impairment of the low range side lobe characteristics due to movement of the target can be more effectively suppressed.

Description of Results of Simulations of First Embodiment

Figure 12:
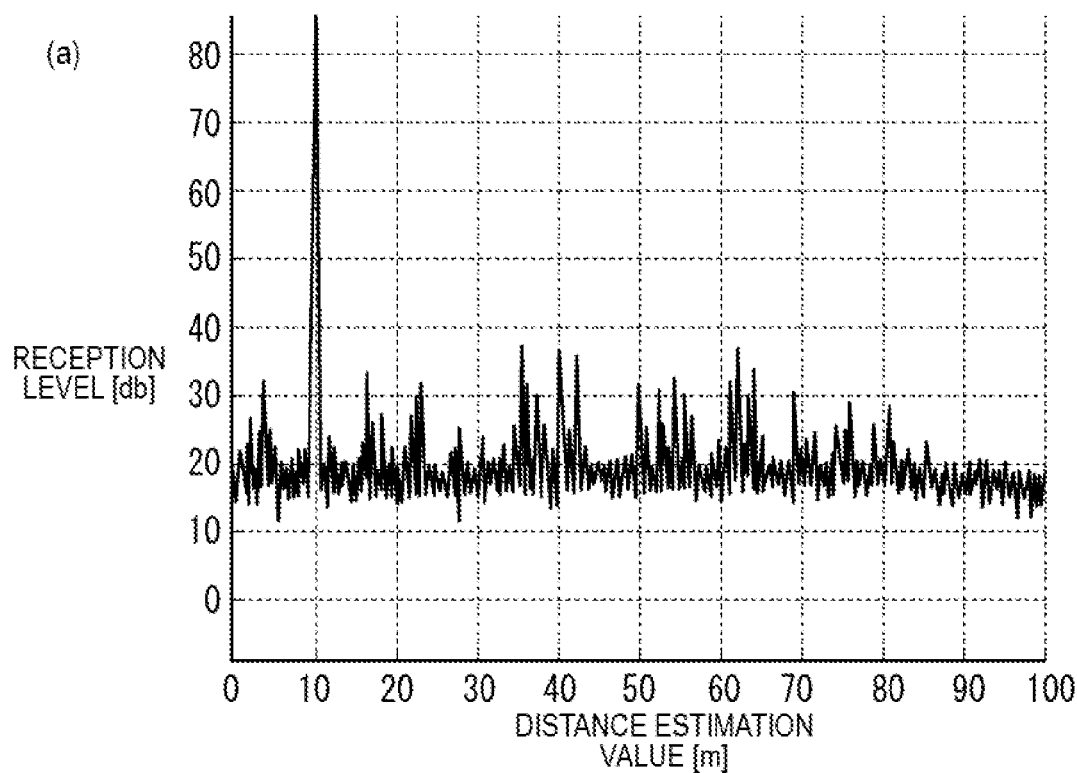
FIG. 12 shows views showing results of simulations related to the accuracy of detection of a target, (a) is a view in the case where radio frequency transmission signals which were generated based on complementary codes $a_n$, $b_n$ were time-divisionally transmitted by a conventional radar device, and (b) is a view in the case where radio frequency transmission signals which were generated by IQ multiplexing complementary codes $a_n$, $b_n$ were transmitted by the radar device of the first embodiment.
Figure 12:
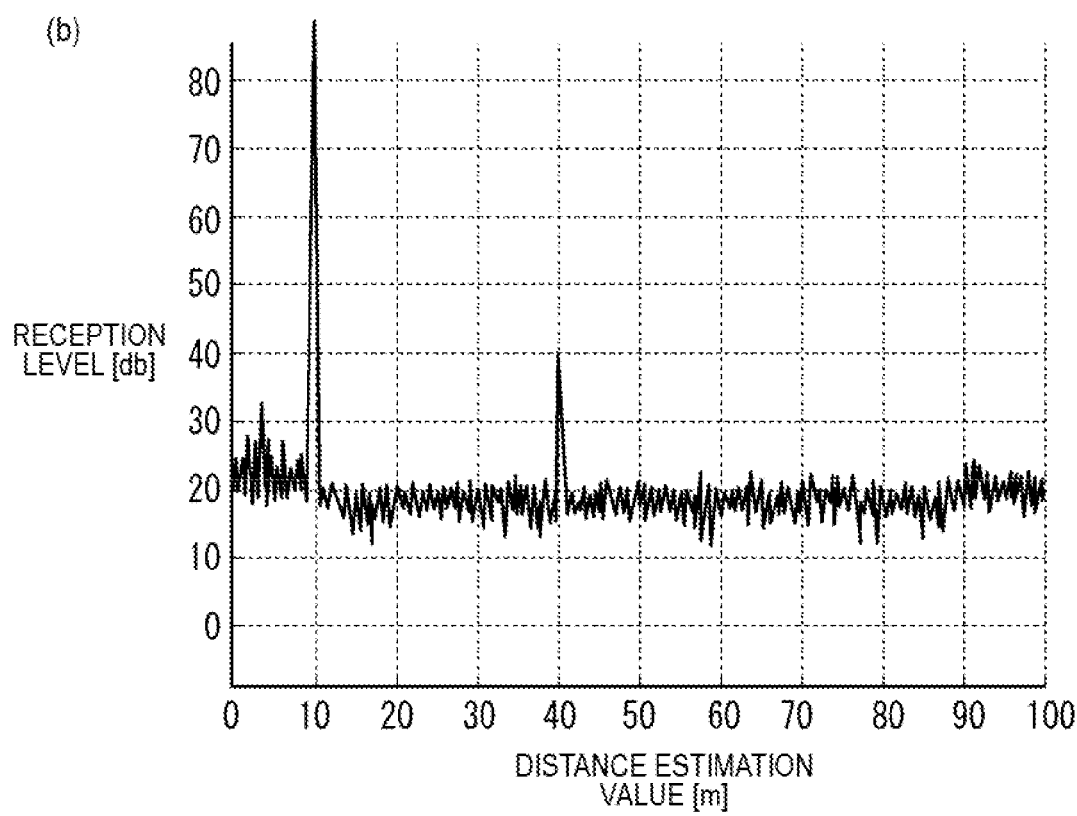

Results of simulations of the accuracy of detecting a target which were conducted while setting operation conditions of the radar device 1 of the first embodiment will be described with reference to FIG. 12. FIG. 12 shows views showing results of simulations related to the accuracy of detection of a target, (a) of the figure is a view in the case where radio frequency transmission signals which were generated based on the complementary codes $a_n$, $b_n$ were time-divisionally transmitted by a conventional radar device, and (b) of the figure is a view in the case where radio frequency transmission signals which were generated by IQ multiplexing the complementary codes $a_n$, $b_n$ were transmitted by the radar device of the first embodiment.

Conditions for the simulations are listed below.
(a) Carrier frequency $f_f$=60 [GHz]
(b) Frequency bandwidth=500 [MHz]
(c) Pulse width $T_p$=2 [ns]
(d) Length L of pulse compression code=256
(e) Transmission period $T_r$=1.024 [s]
(f) Transmission zone $T_w$=0.512 [s]
(g) Transmission power=10 [dB]
(h) Antenna gain=20 [dB]
(i) Radar receiver NF=10 [dB]
(j) Number of averagings (Number of transmissions in transmission period Tr)=20
(k) Number of targets=2
(l) Positions of targets=10 [m], 40 [m]
(m) Target RCS (Radar Cross Section)=20 [dBsm], 0 [dBsm]
(n) Moving speeds of targets=80 [km/h], 0 [km/h]
(o) Doppler frequencies of targets=8,592 [Hz], 0 [Hz]

In FIG. 12(a), the signal (main lobe) of a reflected wave reflected from a target which exists in a position separated from a conventional radar device by 40 [m] is buried in the signal (range side lobe) of a reflected wave reflected from another target which is located at a short distance (10 [m]). In the case where radio frequency transmission signals which are generated respectively based on the complementary codes $a_n$, $b_n$ are transmitted in a time divisional manner by a conventional radar device, as described above, it is difficult to detect the target which is originally located in the position of 40 [m].

However, FIG. 12(b) shows a state where a target which exists in a position separated from the radar device 1 by 10 [m], and that which exists in a position separated by 40 [m] were accurately detected. According to the radar device 1 of the first embodiment, even in the case where the target which exists in a position separated by 10 [m] moves and the influence of the Doppler frequency $f_d$ is exerted, therefore, the low range side lobe characteristics of the signal of a reflected wave reflected from the target can be maintained. According to the radar device 1 of the first embodiment, namely, the target which exists in a position separated by 10 [m], and that which exists in a position separated by 14 [m] can be accurately detected.

Although various embodiments have been described with reference to the accompanying drawings, it is a matter of course that the radar device of the invention is not restricted to the examples. It is obvious to those skilled in the art that various changes and modifications can be made within the scope of the appended claims, and it is to be understood that they naturally belong to the technical scope of the invention.

In the above-described embodiments, the A/D converters 22, 23 convert the in-phase signal and Quadrate signal output from the quadrature detector 20 of the RF receiver 17, to digital data by oversampling corresponding to the discrete time k. However, the A/D converters 22, 23 may not perform A/D conversion at the same sampling rate as the base-band transmission signal in the radar transmitter 2.

In the radar transmitters in the above-described embodiments, for example, the base-band transmission signal is generated by using the sample number of $N_r$ for the code length of L. This corresponds to oversampling of $N_r/L$ samples per code. In the radar receivers in the above-described embodiments, even in the case of one time sample or more per code, however, the signal process on the reception signal is enabled.

Figure 13:
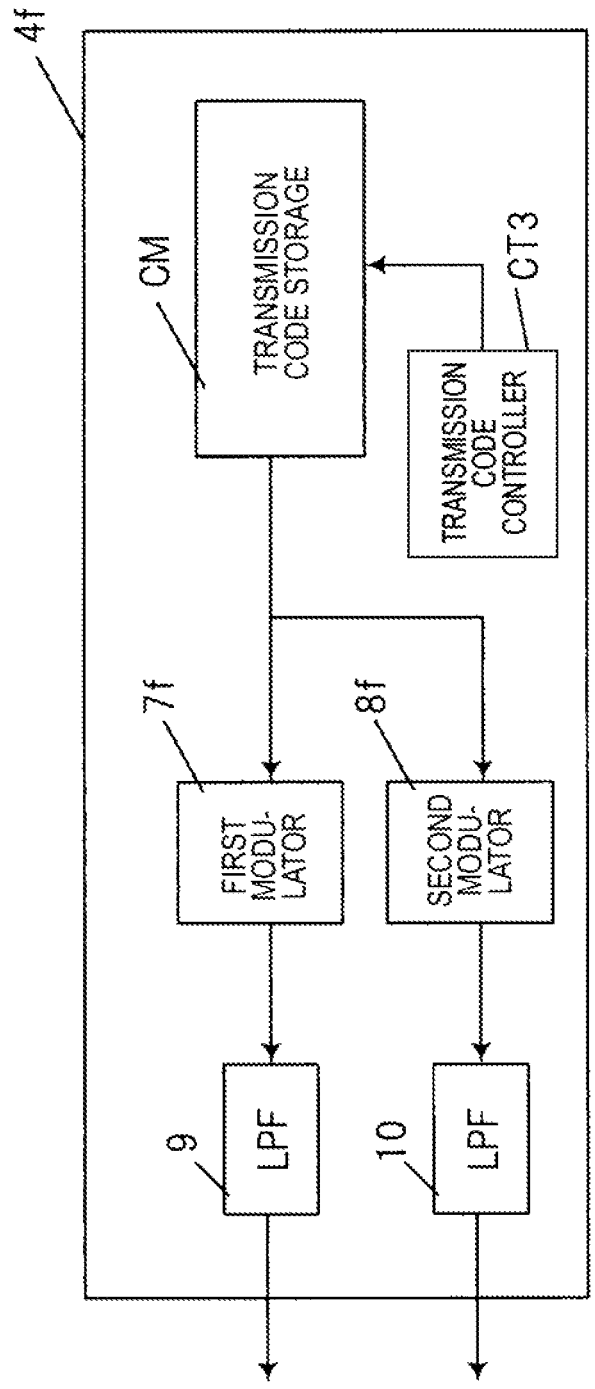
FIG. 13 is a block diagram showing another internal configuration of a transmission signal generator of the radar device of the second embodiment.
Figure 15:
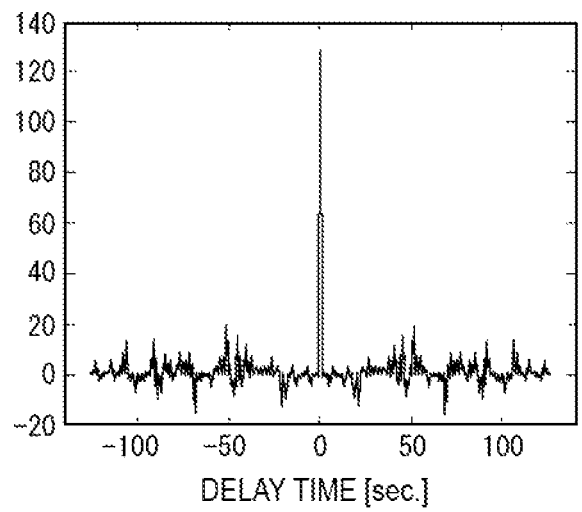
FIG. 15 shows views illustrating the characteristics of a conventional complementary code, (a) is a view showing results of an autocorrelation calculation of one complementary code sequence, (b) is a view showing results of an autocorrelation calculation of the other complementary code sequence, and (c) is a view showing an additional value of the results of the autocorrelation calculations of the two complementary code sequences.
Figure 15:
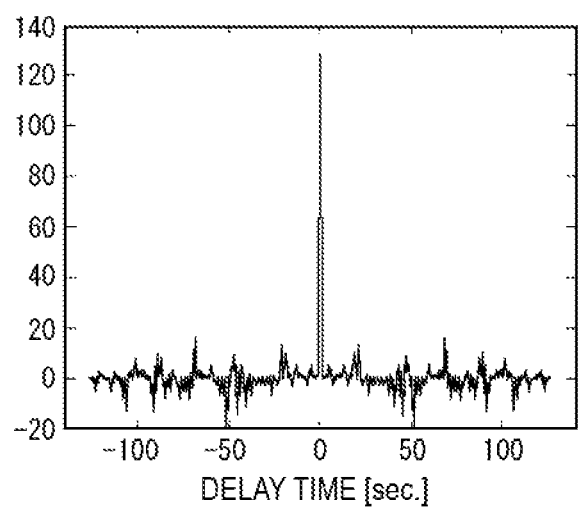
Figure 15:
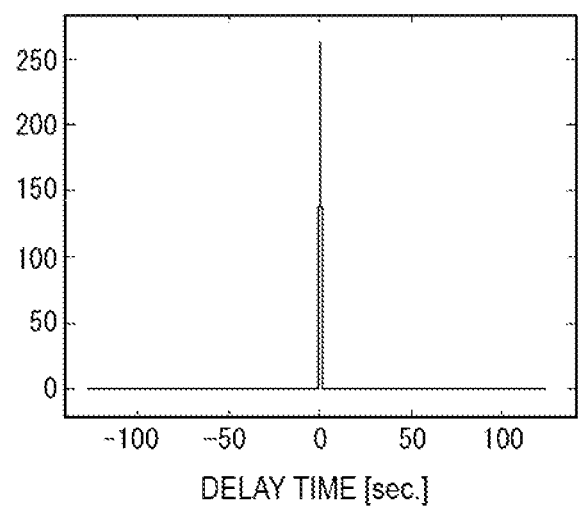
Figure 16:
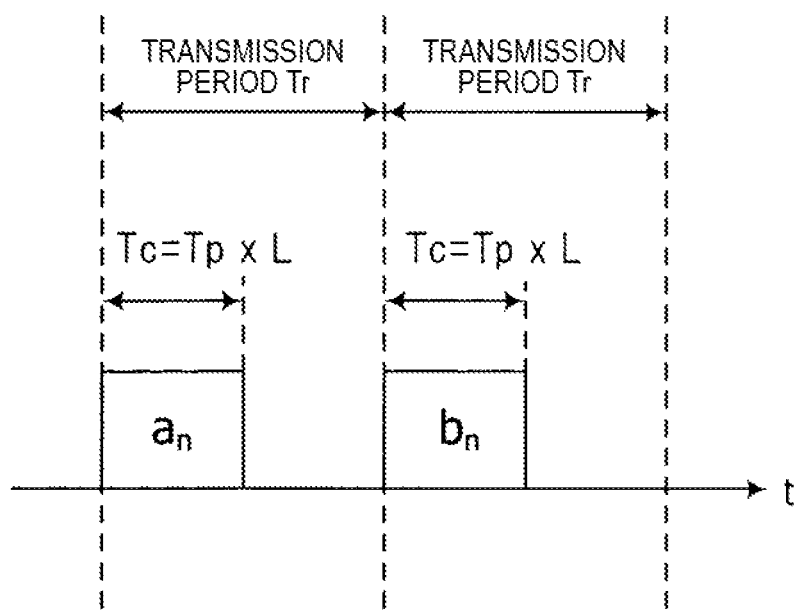
FIG. 16 is a view illustrating transmission periods in a conventional pulse compression radar, and complementary codes which are used in the transmission periods.

The first code generator 5a, second code generator 6a, first switch SW1, and second switch SW2 which are described above may not be disposed in the transmission signal generator 4a, and, as shown in FIG. 13, a transmission code storage CM which previously stores the transmission code an and transmission code $b_n$ generated by the transmission signal generator 4a may be disposed. The transmission code storage CM shown in FIG. 13 is not limited to the second embodiment, but is similarly applicable to the first embodiment. FIG. 13 is a block diagram showing the internal configuration of a transmission signal generator 4f which is another example of the transmission signal generator 4a of the radar device 1a of the second embodiment. The transmission signal generator 4f includes the transmission code storage CM, a transmission code controller CT3, a first modulator 7f, a second modulator 8f, the LPF 9, and the LPF 10.

In FIG. 13, in each transmission period $T_r$, the transmission code controller CT3 cyclically reads out the transmission code to be output to the first modulator 7f and the second modulator 8f, from the transmission code storage 7a, and outputs it. Specifically, in the M-th and (M+2)-th transmission periods $T_r$ shown in FIG. θ(a), the transmission code controller CT3 reads out the transmission code an from the transmission code storage CM, and outputs it to the first modulator 7f, and further reads out the transmission code $b_n$ and outputs it to the second modulator 8f.

In the (M+1)-th and (M+3)-th transmission periods $T_r$ shown in FIG. θ(a), the transmission code controller CT3 reads out the transmission code $b_n$ from the transmission code storage CM, and outputs it to the first modulator 7f, and further reads out the transmission code an and outputs it to the second modulator 8f. The operations subsequent to the respective outputs to the first modulator 7f and the second modulator 8f are similar to those of the above-described embodiments, and therefore description of the similar contents will be omitted.

The application is based on Japanese Patent Application (No. 2010-197023) filed Sep. 2, 2010, and its disclosure is incorporated herein by reference.

INDUSTRIAL APPLICABILITY

The radar device of the invention is useful as a radar device in which, even when a target moves, the low range side lobe characteristics of a signal of a reflected wave from the target is maintained, and the range side lobe level is effectively suppressed, thereby suppressing impairment of the separation performance in detection of a plurality of targets.

DESCRIPTION OF REFERENCE NUMERALS AND SIGNS 1, 1a radar device
2, 2a, 2b, 2c radar transmitter
3, 3a radar receiver
4, 4a, 4b, 4c transmission signal generator
5, 5a first code generator
6, 6a second code generator
7, 7a, 7b, 7c first modulator
8, 8a, 8b, 8c second modulator
9, 10 LPF
11 RF transmitter
12, 14 mixer
13 first phase shifter
15, 28 adder
16, 18 amplifier
17 RF receiver
19 frequency converter
20 quadrature detector
21, 21a, 21d, 21e signal processor
22, 23 A/D converter
24 first reference signal generator
25 second reference signal generator
26 first correlation value calculator
27 second correlation value calculator
29 reception signal extractor
29a reception signal selector
30 IQ multiplex interference component extractor
31 subtracter
32 averaging processor
33 incoming distance estimator
34 Doppler frequency estimator
35, 37 second phase shifter
36, 38 third phase shifter
$ANT_0$ transmission antenna
$ANT_1$ reception antenna
CM transmission code storage
CT1, CT2, CT3 transmission code controller
$L_0$, $L_1$ reference oscillator SW1 first switch
SW2 second switch
$T_r$ transmission period
$T_w$ transmission zone

The invention claimed is:

1. A radar device including:
   a code generator which generates a first code sequence and a second code sequence constituting a pair of complementary codes;
   a first modulator which modulates the first code sequence to generate a first transmission signal;
   a second modulator which modulates the second code sequence to generate a second transmission signal;
   a quadrature modulator which performs quadrature modulation by using the first transmission signal and the second transmission signal that are generated by the first modulator and the second modulator, respectively;
   an amplifier which generates a radio frequency transmission signal from a signal that is quadrature modulated by the quadrature modulator; and
   an antenna which transmits the radio frequency transmission signal from a transmission antenna.

2. The radar device according to claim 1, further comprising:
   a transmission code controller which, in each predetermined transmission period, switches the code sequence which is modulated by the first modulator or the second modulator, from the first code sequence or the second code sequence to the second code sequence or the first code sequence.

3. The radar device according to claim 2, further comprising:
   an RF receiver which converts a signal of the reflected wave that is obtained by reflecting the radio frequency transmission signal received by the reception antenna, from the target, to a base-band reception signal;
   a first correlation value calculator which calculates a first correlation value of the reception signal that is converted by the RF receiver, and a signal being identical with the first transmission signal that is generated by the first modulator;
   a second correlation value calculator which calculates a second correlation value of the reception signal that is converted by the RF receiver, and a signal being identical with the second transmission signal that is generated by the second modulator;
   an adder which adds the first correlation value that is calculated by the first correlation value calculator and the second correlation value that is calculated by the second correlation value calculator, to derive a third correlation value;
   an IQ multiplex interference component extractor which, in the third correlation value that is derived by the adder, extracts a phase component of the third correlation value exceeding a threshold for removing an IQ multiplex interference component that is generated in accordance with transmission of the radio frequency transmission signal, to calculate the IQ multiplex interference component;
   a subtracter which subtracts the IQ multiplex interference component that is calculated by the IQ multiplex interference component extractor, to derive a fourth correlation value; and
   a Doppler frequency estimator which calculates a Doppler frequency that is generated due to movement of the target, based on the first correlation value that is calculated by the first correlation value calculator and the second correlation value that is calculated by the second correlation value calculator.

4. The radar device according to claim 3, further comprising:
   a reception signal selector which, in the third correlation value that is derived by the adder, selects the third correlation value that exceeds the threshold for removing the IQ multiplex interference component that is generated in accordance with transmission of the radio frequency transmission signal, wherein a frequency component in the third correlation value exceeds the Doppler frequency that is calculated by the Doppler frequency estimator.

5. The radar device according to claim 1, further comprising:
   an RF receiver which converts a signal of the reflected wave that is obtained by reflecting the radio frequency transmission signal received by the reception antenna, from the target, to a base-band reception signal;
   a first correlation value calculator which calculates a first correlation value of the reception signal that is converted by the RF receiver, and a signal being identical with the first transmission signal that is generated by the first modulator;
   a second correlation value calculator which calculates a second correlation value of the reception signal that is converted by the RF receiver, and a signal being identical with the second transmission signal that is generated by the second modulator;
   an adder which adds the first correlation value that is calculated by the first correlation value calculator and the second correlation value that is calculated by the second correlation value calculator, to derive a third correlation value;
   an IQ multiplex interference component extractor which, in the third correlation value that is derived by the adder, extracts a phase component of the third correlation value exceeding a threshold for removing an IQ multiplex interference component that is generated in accordance with transmission of the radio frequency transmission signal, to calculate the IQ multiplex interference component; and
   a subtracter which subtracts the IQ multiplex interference component that is calculated by the IQ multiplex interference component extractor, to derive a fourth correlation value.

6. The radar device according to claim 5, further comprising:
   an averaging processor which, for a plurality of transmission periods,
   averages the fourth correlation value that is derived by the subtracter.

7. The radar device according to claim 6, further comprising:
   an incoming distance estimator which calculates an incoming distance of the target based on the fourth correlation value that is averaged by the averaging processor.

8. The radar device according to claim 5, further comprising:
   a reception signal extractor which, in the third correlation value that is derived by the adder, extracts the third correlation value exceeding the threshold for removing the IQ multiplex interference component that is generated in accordance with transmission of the radio frequency transmission signal.

9. The radar device according to claim 1, further comprising:

an A/D converter which converts the reception signal that is converted by the RF receiver, to digital data.

10. The radar device according to claim 1, further comprising:
a first reference signal generator which, in synchronization with a transmission period of the radio frequency transmission signal, generates a first reference transmission signal that is a signal identical with the first transmission signal that is generated by the first modulator; and
a second reference signal generator which, in synchronization with the transmission period of the radio frequency transmission signal, generates a second reference transmission signal that is a signal identical with the second transmission signal that is generated by the second modulator.

11. The radar device according to claim 1, further comprising:
a second phase shifter which, before modulation by the first modulator, applies phase rotation of 45 degrees or −45 degrees to the first code sequence; and
a third phase shifter which, before modulation by the second modulator, applies phase rotation of 45 degrees or −45 degrees to the second code sequence.

12. The radar device according to claim 1, further comprising:
an RF receiver which converts a signal of the reflected wave that is obtained by reflecting the radio frequency transmission signal received by the reception antenna, from the target, to a base-band reception signal;
a first correlation value calculator which calculates a first correlation value of the reception signal that is converted by the RF receiver, and a signal being identical with the first transmission signal that is generated by the first modulator;
a second correlation value calculator which calculates a second correlation value of the reception signal that is converted by the RF receiver, and a signal being identical with the second transmission signal that is generated by the second modulator;
an adder which adds the first correlation value that is calculated by the first correlation value calculator and the second correlation value that is calculated by the second correlation value calculator, to derive a third correlation value;
an IQ multiplex interference component replica generator which, in the third correlation value that is derived by the adder, calculates an IQ multiplex interference component that is generated in accordance with transmission of the radio frequency transmission signal, based on a phase component of the third correlation value exceeding a threshold for removing the IQ multiplex interference component; and
a subtracter which subtracts the IQ multiplex interference component that is generated by the IQ multiplex interference component replica generator, from the third correlation value exceeding the threshold, to derive a fourth correlation value.

* * * * *